(12) United States Patent
Siu et al.

(10) Patent No.: US 8,465,149 B2
(45) Date of Patent: Jun. 18, 2013

(54) SPECTACLES

(76) Inventors: Yu Siu, Shatin New Territories (HK);
Wenjie Dai, Shatin New Territories (HK)

(*) Notice: Subject to any disclaimer, the term of this patent is extended or adjusted under 35 U.S.C. 154(b) by 255 days.

(21) Appl. No.: 12/807,951

(22) Filed: Sep. 16, 2010

(65) Prior Publication Data
US 2011/0013134 A1  Jan. 20, 2011

Related U.S. Application Data

(63) Continuation-in-part of application No. 12/384,411, filed on Apr. 3, 2009, now Pat. No. 7,967,431.

(60) Provisional application No. 61/194,096, filed on Sep. 23, 2008.

(51) Int. Cl.
*G02C 1/02* (2006.01)

(52) U.S. Cl.
USPC .................................. 351/110; 351/124

(58) Field of Classification Search
USPC ................... 351/110, 124, 158, 41
See application file for complete search history.

(56) References Cited

U.S. PATENT DOCUMENTS

| 5,847,800 | A  | * | 12/1998 | Tachibana | 351/110 |
| 6,540,350 | B2 | * | 4/2003  | Fujita    | 351/110 |
| 7,086,733 | B1 | * | 8/2006  | Bac       | 351/110 |
| 7,658,492 | B2 | * | 2/2010  | Siu       | 351/110 |
| 7,967,431 | B2 | * | 6/2011  | Siu       | 351/110 |

* cited by examiner

*Primary Examiner* — Hung Dang
(74) *Attorney, Agent, or Firm* — Raymond Y. Chan; David and Raymond Patent Firm

(57) ABSTRACT

A pair of rimless spectacles includes two lenses, a frame including two temple units and a bridge, and a connection mechanism. The connection mechanism includes a plurality of first connectors spacedly provided at the lenses at a predetermined location and a plurality of second connectors provided at a predetermined location of each of the temple units and the bridge respectively, wherein the second connectors are coupled with the first connectors respectively to couple the temple units at two outer sides of the lenses respectively and to couple the bridge between two inner sides of the lenses respectively in a tool-less manner.

10 Claims, 46 Drawing Sheets

SPECTACLES

CROSS REFERENCE OF RELATED APPLICATION

This is a Continuation-In-Part application that claims the benefit of priority under 35 U.S.C. §119 to a non-provisional application, application Ser. No. 12/384,411, filed on Apr. 3, 2009, now U.S. Pat. No. 7,967,431 which is a non-provisional application of a provisional application having an application No. 61/194,096 and a filing date of Sep. 23, 2008.

BACKGROUND OF THE PRESENT INVENTION

1. Field of Invention

The present invention relates to spectacles, and more particularly to a rimless spectacles, wherein a plurality of coupling slots are located at the lenses to engage with the temples and the bridge, so as to allow the lenses to be quickly fastened on the temples and the bridge to form an entire body structure of the rimless spectacles.

2. Description of Related Arts

Corrective lens have been existed in human history for a long time. People have used corrective lens to modify the focal length of the eyes and the corrective lens have gradually evolved to wearable glasses. Wearable glasses have been more widely used in modern society. Conventional glasses comprise a lens unit mounted at a frame unit. The frame unit usually comprises a frame, two temples and a bridge. Traditionally, the frame, the temples and the bridge are made integrally to form the frame unit. In other words, the frame, the temples and the bridge are all connected altogether in conventional spectacles, wherein each temple is fastened by a screw to an outer side of the frame.

The main purpose for people to wear spectacles is to correct vision or protect the eyes. Also, since spectacles are usually placed on the faces of people, people have even higher demands on the aesthetic value of the spectacles. As illustrated above, the frame is an indispensable component of the spectacles and the frame is usually adapted to secure the lens unit. Also, the conventional frame of the spectacles is usually made of metal materials or other stiff materials. So, when people wear spectacles, existence of the spectacle frame usually change the person's appearance on the face which is also a shortcoming of conventional spectacles.

With development of the society, more and more varieties extend from the conventional spectacles, such as rimless spectacles. Structurally, the rimless spectacles comprise lenses, temples, and a bridge directly connecting two lenses, wherein more than one connection holes are on each lens, such that the temples and the bridge are connected at the connection holes respectively. Generally speaking, the lens is made by glass materials, especially for near-sighted and farsighted spectacles. Furthermore, the thickness of the lens in the middle is different from that on the side. In other words, the surface of the lens of either near-sighted or farsighted spectacles is not a flat surface, and the difficulty of drilling holes thereon is thus increased. Normally, when drilling the holes on an object, the drilling device has to be perpendicular to the surface to be drilled to achieve the best drilling effect. In addition, the stiffness of glass materials is high and drilling holes thereon is likely to cause the glass material to break.

In addition, the tolerance of the hole must be considered. If the hole is too big, the lens will be unstable after the temples and the bridge are mounted thereto. If the hole is too small, the temples and the bridge cannot be affixed thereto. Or the lens will be cracked when the temples and the bridge are forced to affix to the lens.

With the difficulty in drilling holes on the lens mention above, it is inconvenient for customers to purchase rimless spectacles because when one chooses his or her own rimless spectacles, the lenses and the spectacle frame are separately chosen by the customer and put together by a technician. Because of the difficulty in drilling holes on an uneven lens surface, the technician usually takes longer time to put the lenses and the spectacle frame together. In other words, the customer has to wait for a long time from choosing the spectacles to actually receiving the final product.

Improved rimless spectacles are found in the market that the rimless spectacles do not require any hole predrilled on the lens. The lens has a notch pre-formed at the peripheral edge to fit a core-wire at the notch. Therefore, the temples and the bridge can be mounted to the lenses through the wires. However, such rimless spectacles can be made only in particular styles of lenses and the assembling operation is relatively complicated.

Furthermore, if the wears of the glasses want to have different styles of frame, temples, or the bridge for aesthetic purposes, the wear usually has to purchase the whole set of lens and frame units in order to have correct focus of the lens with respect to the eyes of wearer. However, the lens, especially the optical lens, is the most expensive part of the spectacles, so that the wear may not be able to afford having multiple spectacles. The lens usually being shaped to fit the individual frame unit and integrally secure thereon, so that the wear normally has to purchase expensive lens for each of individual frame unit of spectacles. The rimless type of glasses, as mentioned above, usually has a drilled hole on the outer edge of the lens located at a specific location and thickness in order to fit the individual temples and bridge, so that the damaged lens with the drilled hole can hardly be secured on other frame units of the spectacles.

Some of the lenses of the spectacles may have plurality of coupling slots having an opening formed at peripheral edge of the lenses, so that a clipping connector may be able to slidably and detachably engaging with the coupling slot via the opening, so that there's no need for technicians to drill holes on the lenses. However, the clipping connector may outwardly slide out of the coupling slot through the opening by accident. Especially for the hyperopic type lens having a larger thickness at central part thereof, such as hyperopic lenses, the clipping connector tends to easier to outwardly slide out of the coupling slot.

Another main concern of traditional coupling method between the frame, including the bridge and/or the temples, and the lenses is that the lenses has to be precisely grinded to a shape and size exactly matching the connectors at the bridge or the temples for coupling therewith, so that the complicated drilling or grinding lenses process is time consuming and increase the cost the spectacles. For example, the spectacles with rim frame surrounding the peripheral edge of each of the lenses traditionally has a coupling groove for interlockingly coupling with the respectively lenses. Therefore, the peripheral lenses have to be grinded to a predetermined shape and angle in order to fittedly being received within the coupling groove at the inner edge of the rim frame. If the lenses did not be grinded to the predetermined coupling angle and shape, an undesired reflection is generated from the outer peripheral edge of the lens at the connection between each of the lenses and the rim frames. Especially for those more sophisticated spectacles, those unwanted reflections will dramatically reduce the aesthetic feeling of the spectacles. Therefore, if there is any tiny mistake occurred during the grinding process of the lenses, the failed lenses lead the spectacles manufactures or makers have no choice but throw away those expensive lenses away.

SUMMARY OF THE PRESENT INVENTION

The invention is advantageous in that it provides spectacles, wherein the spectacles are manufactured by a unique method to provide a special connection way to connect the lenses and the spectacle frame.

Another object of the present invention is to provide spectacles, wherein the length of the outer edge of the slot sidewall slightly larger than the length of the inner edge of the slot sidewall is able to dramatically enhance the coupling force between the second connector and respective first connector, so as to securely and simply couple the bridge and/or temple units with the respective lenses to further prevent the second connector outwardly slid out of the first connector.

Another object of the present invention is to the provide spectacles, wherein each of the lenses thereof comprises a plurality of first connectors corresponding to second connectors at the temple units and/or the bridge, such that the lenses can be fastened on the temple units and/or the bridge via the first and second connectors.

Another object of the present invention is to provide the spectacles, wherein it is not necessary to drill any hole on the lenses, so the difficulty in manufacturing is reduced and the manufacturing efficiency is thus increased.

Another object of the present invention is to provide the spectacles, wherein when a customer purchases the spectacles, he or she can receive the final product quickly due to special manufacturing and connection design of rimless spectacles in the present invention.

Another object of the present invention is to provide the spectacles, wherein the coupling slot of first connector comprises the coupling groove and the retention groove integrally formed at rear of the coupling groove, so that the clipping member of the second connector is able to securely retained in the retention groove when the connecting member of the second connector is inwardly slid into the coupling groove.

Another object of the present invention is to provide the spectacles, wherein the slanted surfaces inclinedly extended within the retention groove are able to prevent the clipping member accidentally and outwardly slid out of the coupling slot.

Another object of the present invention is to provide the spectacles, wherein the slanted surfaces of the retention slot are able to further be adapted for the clipping member biasing against the slanted surfaces for enhancing the clipping force of the clipping member, so as to securely coupling the first connector with the second connector.

Another object of the present invention is to provide the spectacles, which provides a coupling method for the easily connecting the bridge and/or temple units with the respective lenses without precisely complicated drilling or grinding lenses processes. Therefore, there is no need to grind the lenses to a precise shape or angle in order to match the coupling groove at the inner edge of the frame of the rims as mentioned above.

In order to accomplish the goal of the present invention, the spectacles comprise:

two lenses, each of which has a front side, a rear side, and a peripheral edge which is defined between laterals of the front and the rear sides;

a frame comprising two temple units and a bridge;

a connection unit comprising a plurality of first connectors provided at the peripheral edges of the lenses respectively and a plurality of second connectors, which are located at the two temple units and/or the bridge to detachably couple with the first connectors respectively, such that the frame is assembled with the lenses by detachably coupling the second connectors with the first connector to form the spectacles.

Additional advantages and features of the invention will become apparent from the description which follows, and may be realized by the following description of the instrumentalities and combinations particular pointing out in the appended claims.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
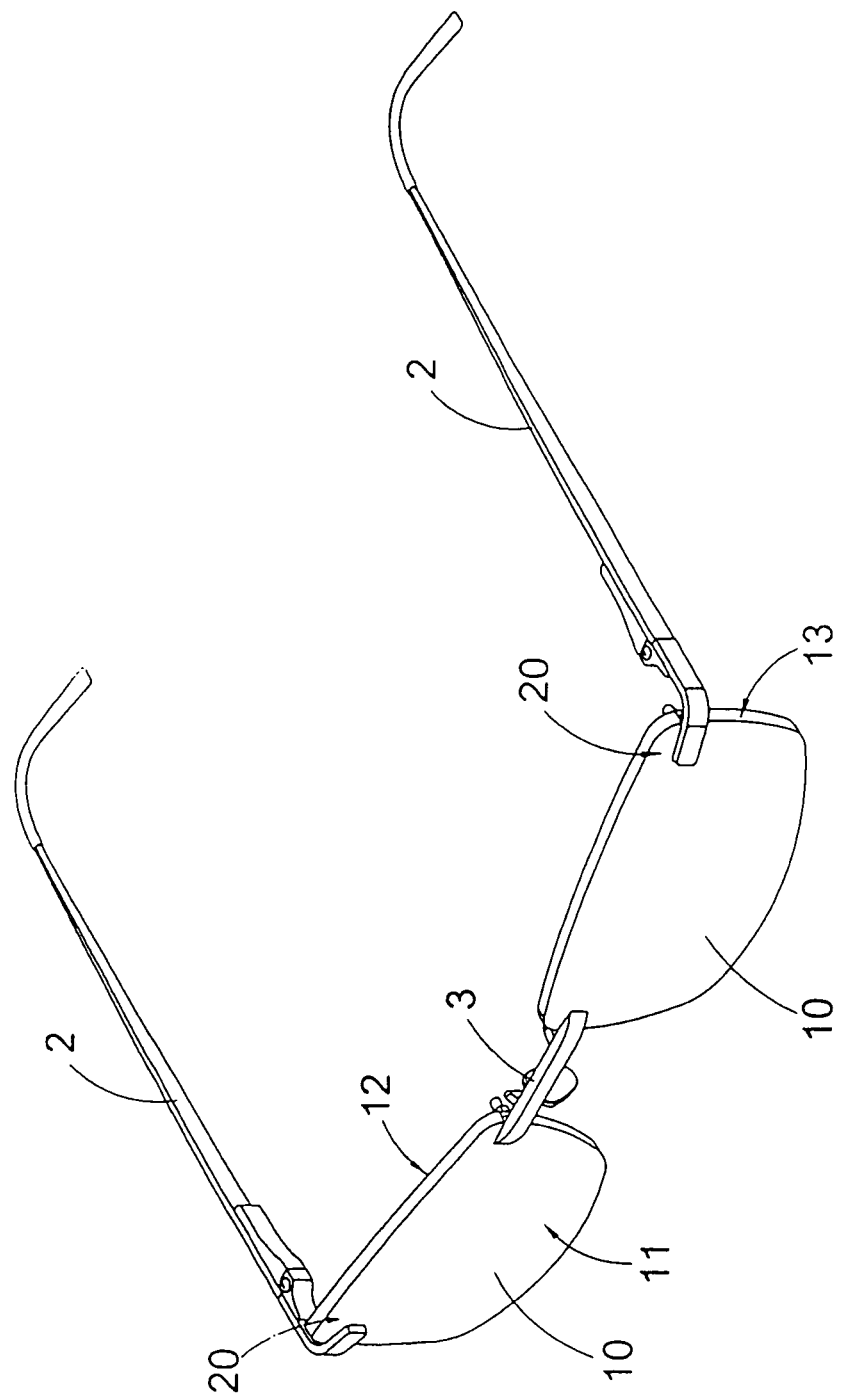
FIG. 1 is a perspective view of rimless spectacles according to a first embodiment of the present invention.
Figure 2:
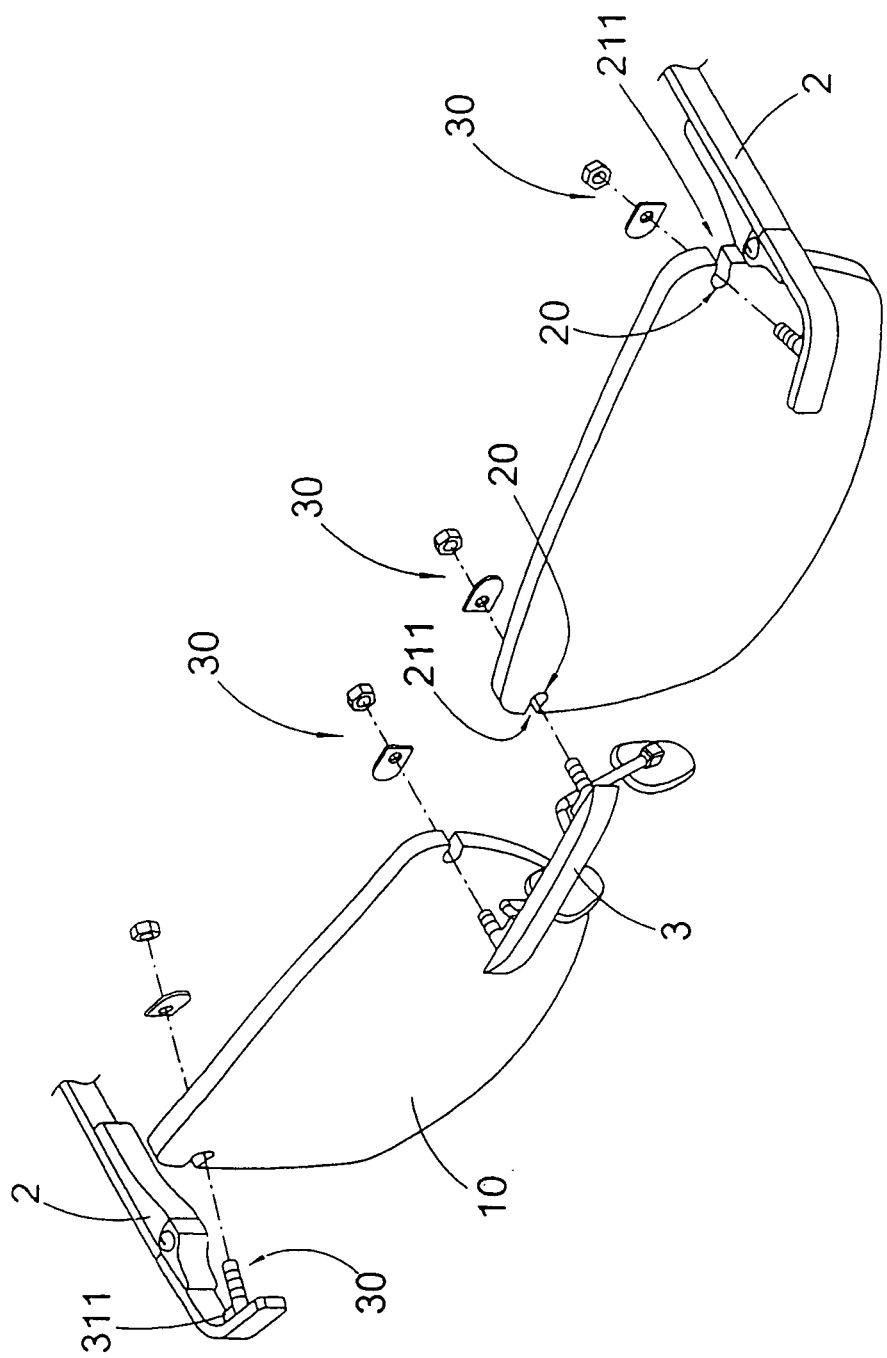
FIG. 2 is an exploded perspective view of the rimless spectacles according to the first embodiment of the present invention.
Figure 3:
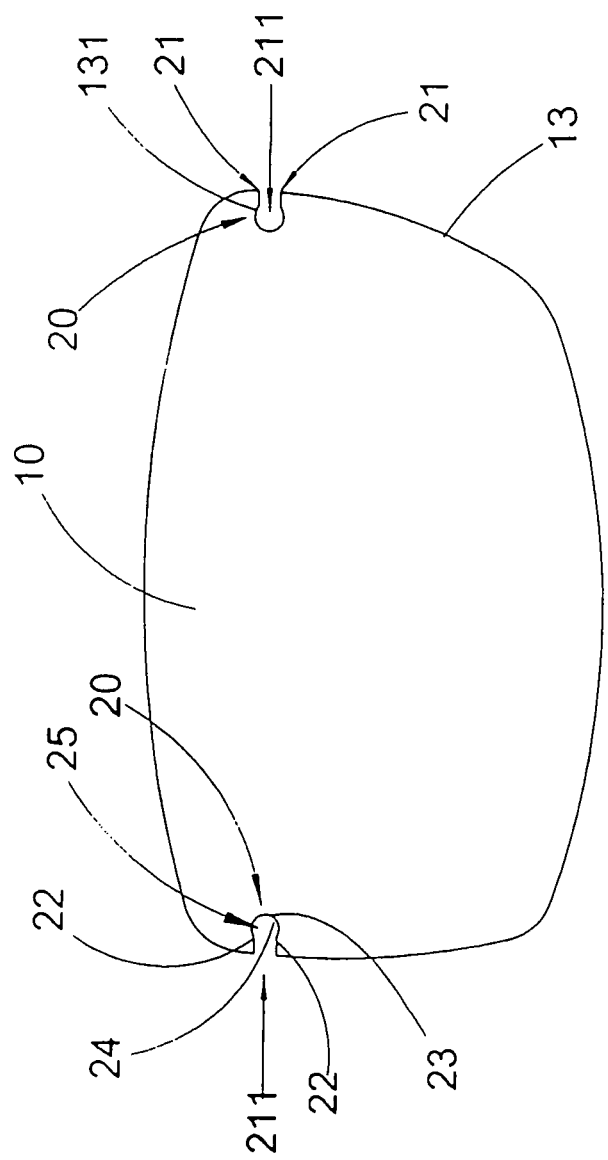
FIG. 3 is a schematic view of a lens of the rimless spectacles according to the first embodiment of the present invention.

Referring to FIG. 1 to FIG. 3 of the drawings, a rimless spectacles according to preferred embodiment of the present invention is illustrated, wherein the rimless spectacles comprises two lenses 10. Each of the lenses 10 has a front side 11, a back side 12, and a peripheral edge 13 located between the laterals of front and the rear sides 11, 12. A plurality of first connectors 20 of the connection mechanism are spacedly provided at the peripheral edges 13 of the lenses 10 respectively at the inner and outer sides of each of the lenses 10.

The rimless spectacles further comprise a frame which comprises two temple units 2 and a bridge 3. The temple units 2 are arranged to correspondingly couple with two outer sides of the lenses 10 respectively, and the bridge 3 is adapted to couple with two inner sides of the lenses 10 respectively.

The rimless spectacles further comprises a plurality of second connectors 30 of the connection mechanism provided at the temple units 2 and the bridge 3 respectively, wherein the second connectors 30 are detachably engaged with the first connectors 20 at the lenses 10 to couple the temple units 2 and the bridge 3 with the lenses 10 to form the rimless spectacles without any tool.

As shown in FIG. 3, each of the first connectors 20 is a coupling slot 20 indently formed at the peripheral edge 13 of the respective lens 10 to define two spaced apart opening edges 21 at the peripheral edge 13 and an opening 211 between the opening edges 21.

More specifically, the coupling slot 20 has two side surfaces 22 and an enlarged arc surface 23 extending therefrom to form a coupling groove 25, wherein the two side surfaces 22 are facing toward each other and are inwardly extended from two opening edges 21 respectively. The distance between the two side surfaces 22 is larger than the distance between the two opening edges 21 such that the width of the opening 211 is smaller that the distance between the two side surfaces 22.

The arc surface 23, which is integrally extended from the two side surfaces 22 respectively, defines a curved contacting surface 24, wherein the coupling groove 25, which is the coupling slot 20, is defined within the two side surfaces 22 and the curved contacting surface 24.

Figure 4:
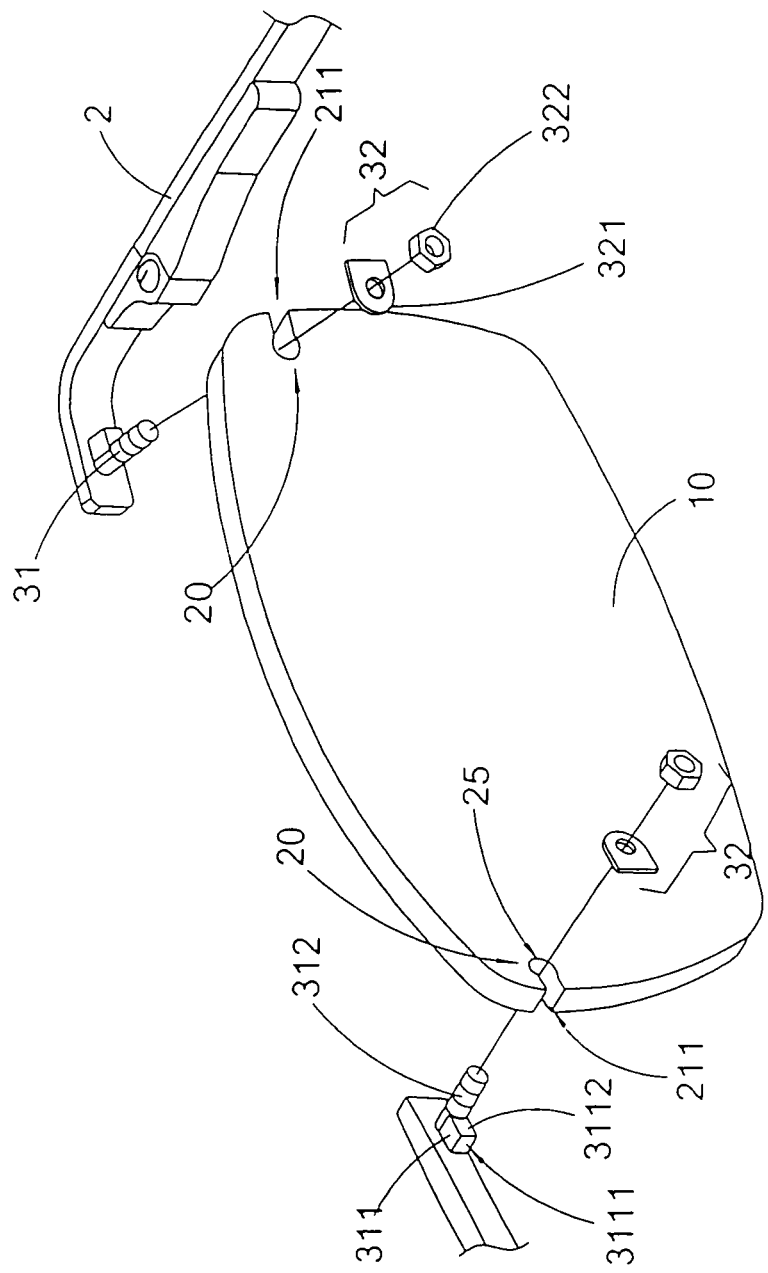
FIG. 4 is a schematic view of the structure of the rimless spectacles according to the first embodiment of the present invention, illustrating the assembling structure of the rimless spectacles.
Figure 5:
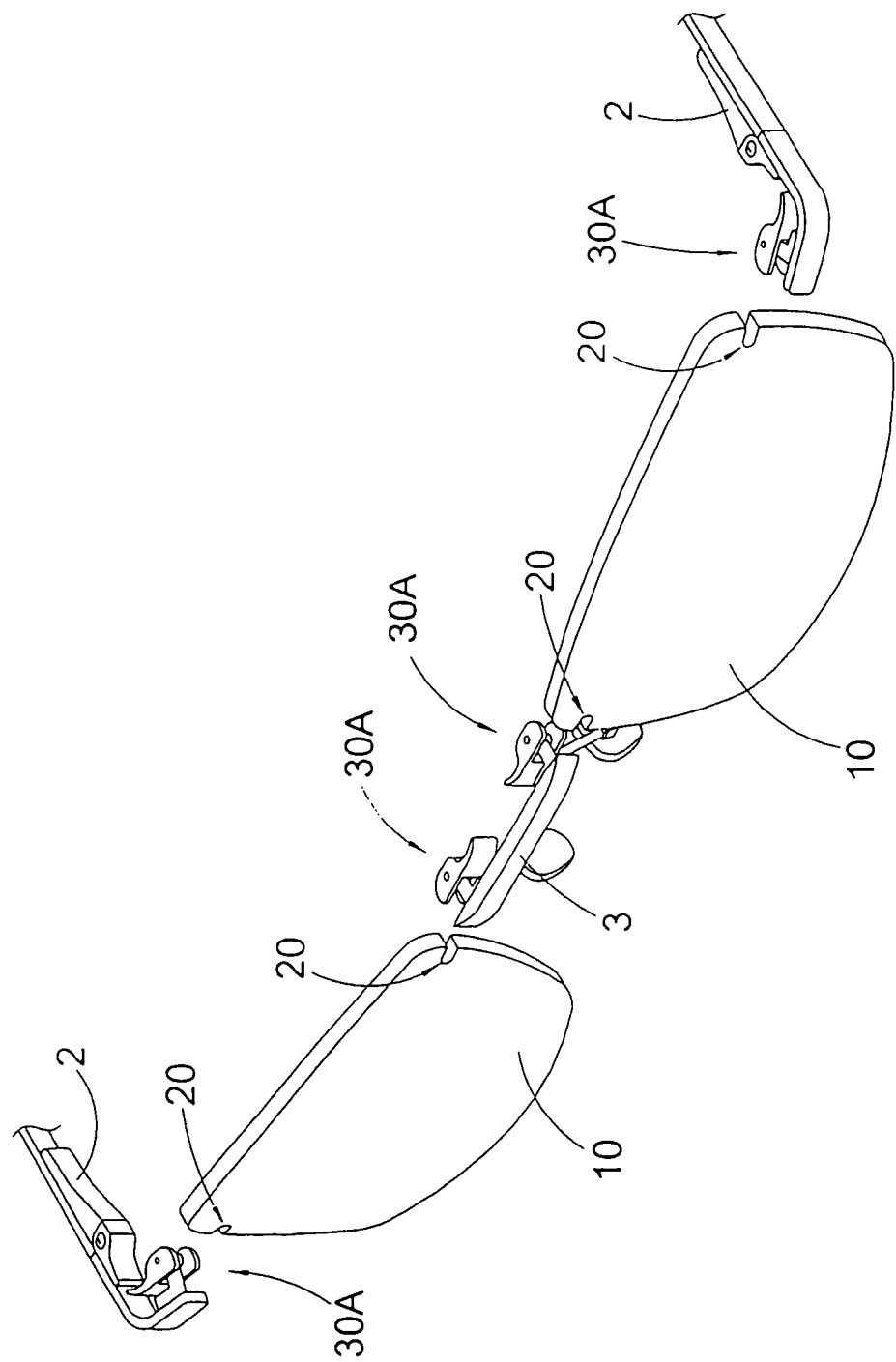
FIG. 5 is an exploded perspective view of the rimless spectacles according to a second embodiment of the present invention.
Figure 6:
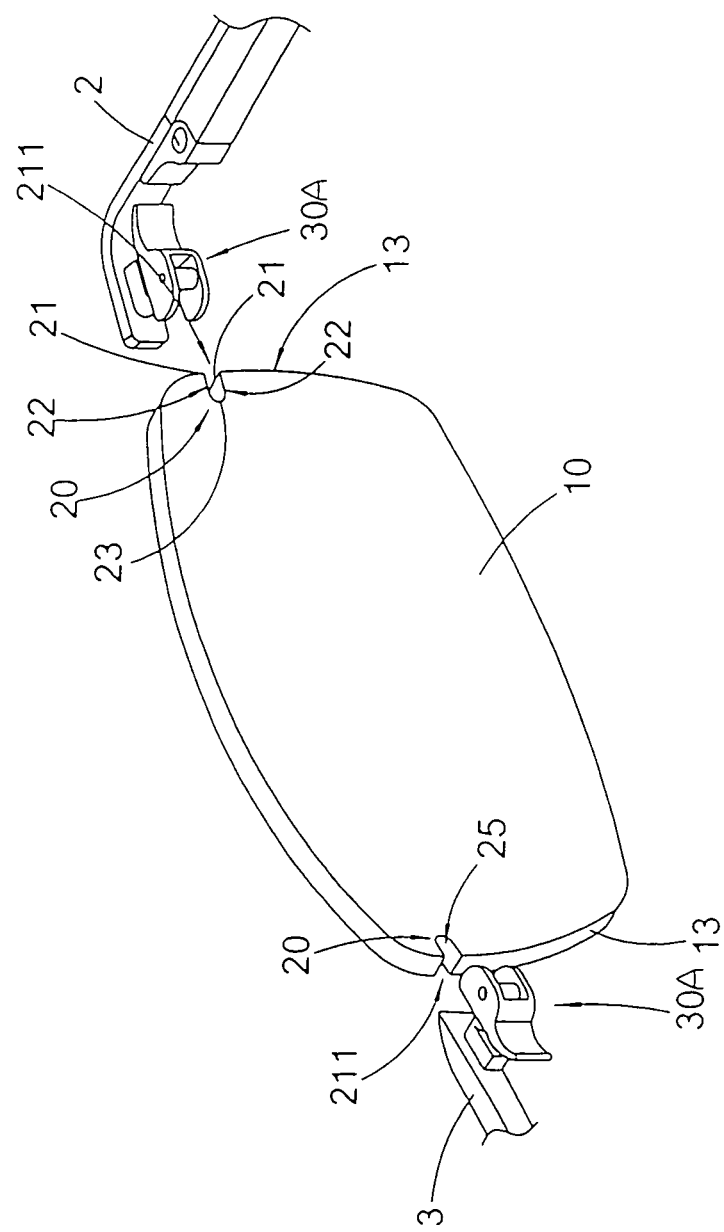
FIG. 6 is an exploded perspective view of the structure of the rimless spectacles according to the second embodiment of the present invention.
Figure 8:
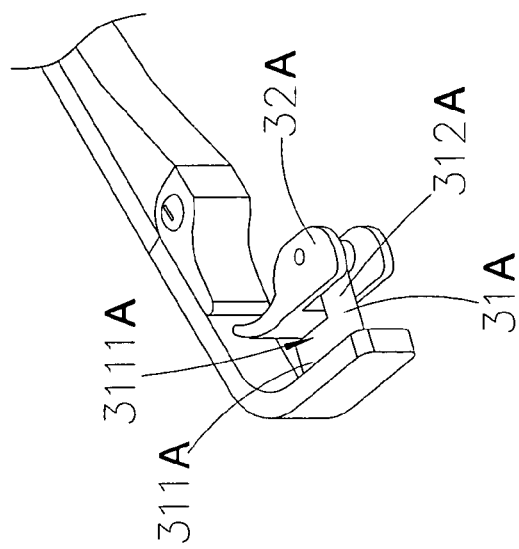
FIG. 8 is a schematic view of the second connector of the rimless spectacles according to the second embodiment of the present invention.
Figure 7:
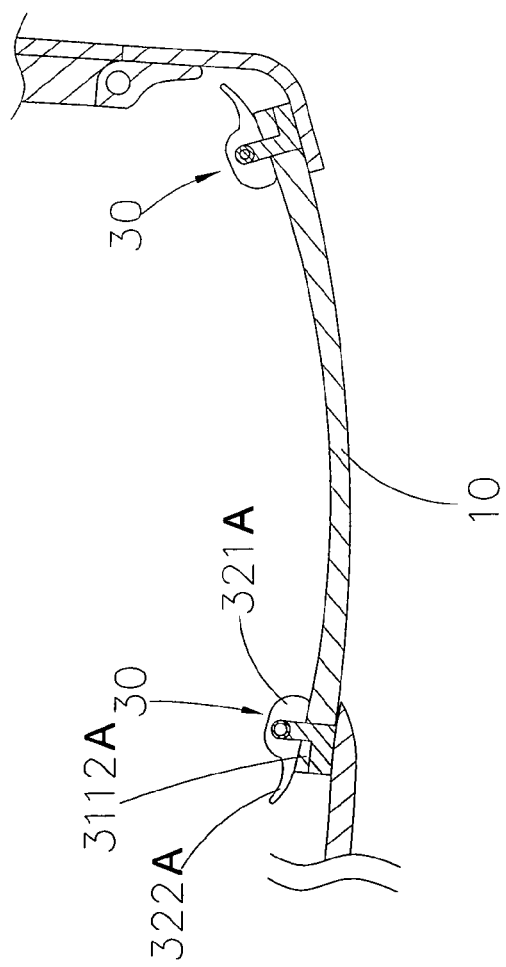
FIG. 7 is a sectional view of the structure of the rimless spectacles according to the second embodiment of the present invention.

Referring to FIG. 2 and FIG. 4, each of the second connectors 30 comprises a retention element 31 and a fastening element 32, wherein the retention elements 31 are provided at the temple units 2 and the bridge 3 respectively. Each of the connecting elements 31 comprises a retention inserter 311 and a coupling inserter 312 extended from the retention inserter 311. The shape of the retention inserter 311 is designed correspondingly to the shape coupling groove 25. The retention inserter 311 has a retention surface 3111 and a biasing surface 3112, wherein the retention surface 3111 is shaped and sized corresponding to the curved contacting surface 24. When the retention inserter 311 is slidably engaged with the coupling slot 20, the retention surface 3111 of the retention inserter 311 is biased against the curved contacting surface 24 to securely retain the second connector 30 at the predetermined location of the respective lens 10.

Accordingly, the coupling inserter 312 is integrally extended from the retention inserter 311. More specifically, the coupling inserter 312 is integrally protruded from the retention inserter 311.

The fastening element 32, corresponding to the retention element 31, comprises a locking panel 321 and a locking unit 322. When the second connector 30 is placed at the coupling slot 20 of the lens 10, the second connector 30 is fastened thereat via the locking panel 321 and the locking unit 322. In other words, after the retention inserter 311 is slidably inserted into the coupling groove 25 at the front side 11 of the respective lens 10, the locking panel 321 is slidably biased against the biasing surface 3112 through the coupling inserter 312 at the rear side 12 of the lens 10, such that the locking unit 322 is locked at the coupling inserter 312 to form a secured locking structure between the first and second connectors 20, 30. Therefore, the locking structures of the first and second connectors 20, 30 achieve the goal of fast and firmly connecting the temple units 2 and the bridge 3 with the lenses 10 to form the entire body rimless structure of the spectacles, as shown in FIG. 1.

Since the coupling slot 20 in the present invention is continuous channel defined by two opening edges 21 which are inwardly extended, such that it is unnecessary to drill any hole on the lenses 10 in the present invention. Technicians can easily cut at the peripheral edge 13 inwardly to form two side surfaces 22 and the arc surface 23 to form the coupling slot 20.

As shown in FIGS. 5 to 8, the rimless spectacles of a second embodiment illustrate an alternative mode of the first embodiment of the present invention. Accordingly, the distance between the two side surfaces 22 equals to the width of the opening 211. In other words, the two side surfaces 22 are extended in a parallel manner. Each of the second connectors 30A comprises a connecting member 31A and a clipping member 32A, wherein the connecting members 31A are provided at the temple units 2 and the bridge 3 respectively. Each of the connecting members 31A comprises a retention inserter 311A and a coupling shaft 312A, wherein the retention inserter 311A has a shape and size corresponding to the shape and size of the respective coupling slot 25. Each of the retention inserters 311A has a retention surface 3111A and a biasing surface 3112A, wherein the retention surface 3111A is shaped and sized corresponding to the curved contacting surface 24. When the retention inserter 311A is slidably inserted into the corresponding coupling slot 20 inwardly from the peripheral edge 13 of the lens 10, the retention surface 3111A of the retention inserter 311A is biased against the curved contacting surface 24 to securely retain the second connector 30A at the predetermined location of the respective lens 10.

Accordingly, the coupling shaft 312A is coupled with the retention inserter 311A. More specifically, the coupling shaft 312A is coupled with the retention inserter 311A to bias against the biasing surface 3112A thereof.

The clipping member 32A is pivotally engaged with connecting member 31A, wherein the clipping member 32A comprises a pressuring clipper 321A and a trigger 322A. The pressuring clipper 321A is pivotally coupled with the coupling shaft 312A of the connecting member 31A while the trigger 322A is extended from the pressuring clipper 321A. When the connecting member 31A of the second connector 30A is slidably inserted into the coupling slot 20 at the peripheral edge 13 of the lens 10, the trigger 322A is actuated to pivotally move the pressuring clipper 321A to bias against the biasing surface 3112A at the rear side 12 of the lens 10 such that temple units 2 and the bridge 3 can be quickly and firmly engaged with the lenses 10 by the clipping force.

Figure 9:
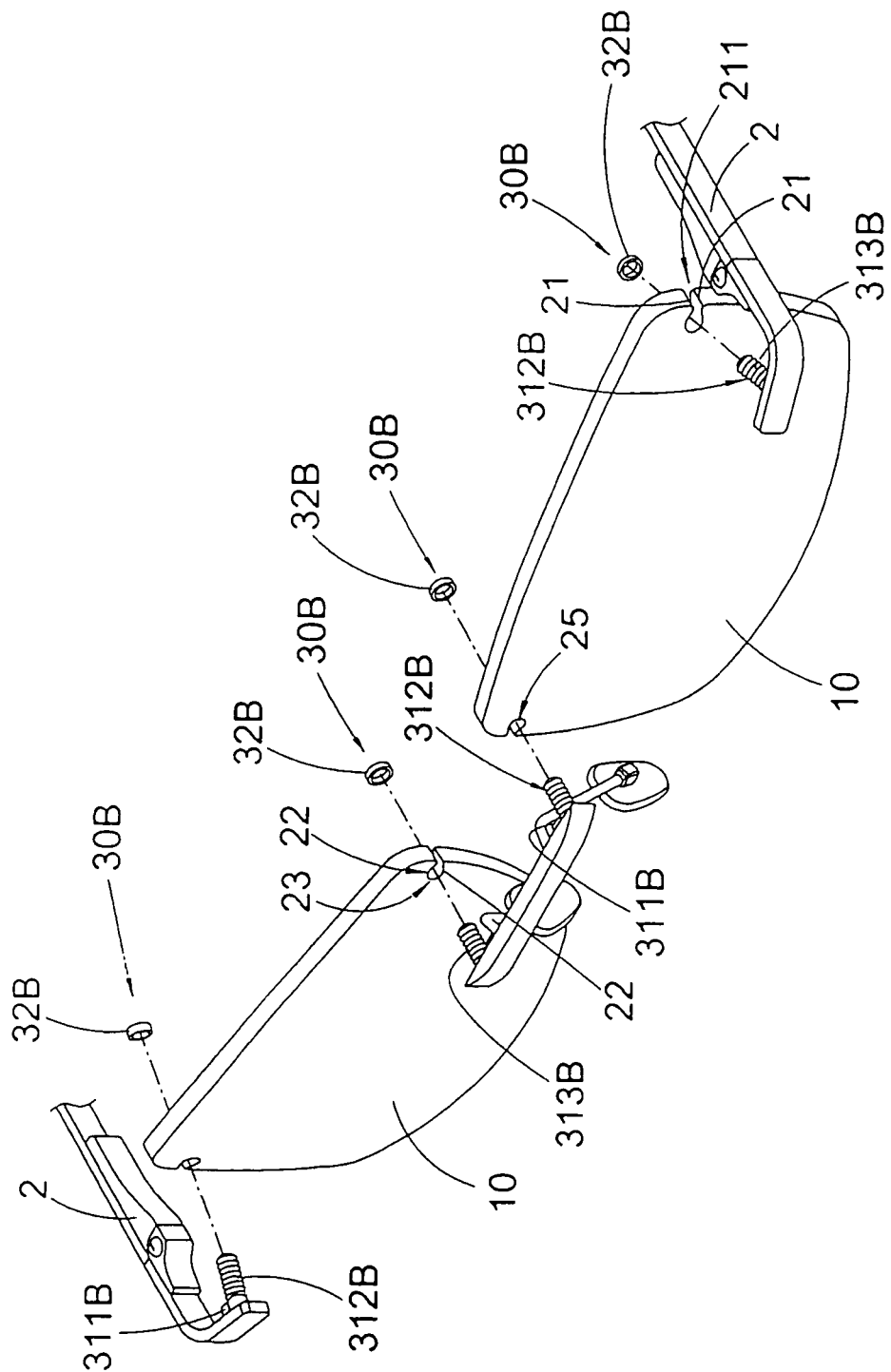
FIG. 9 is an exploded perspective view of the rimless spectacles according to a third embodiment of the present invention.
Figure 10:
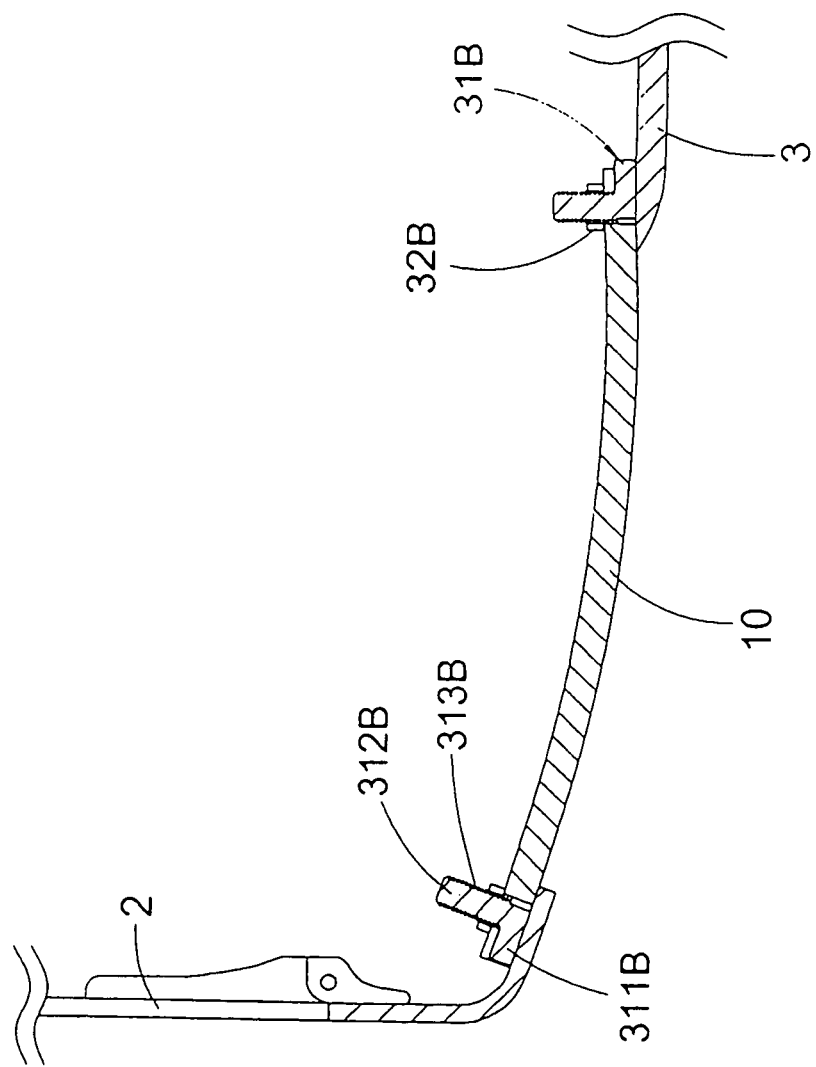
FIG. 10 is a sectional view of the structure of the rimless spectacles according to the third embodiment of the present invention.
Figure 11:
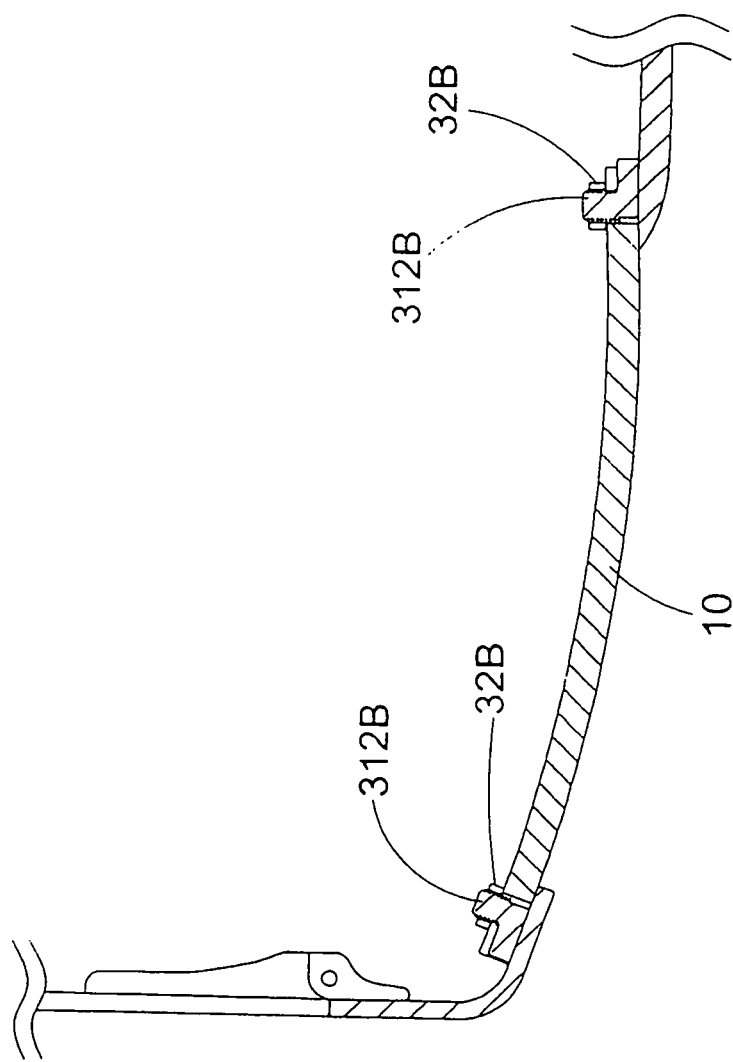
FIG. 11 illustrates an alternative mode of the structure of the rimless spectacles according to the third embodiment of the present invention.

As shown in FIGS. 9 to 11, the rimless spectacles of a third embodiment illustrate an alternative mode of the first embodiment of the present invention. The second connector 30B comprises a retention element 31B and a fastening element 32B, wherein the retention element 31B are provided at the temple units 2 and the bridge 3 respectively. Each of the retention element 31B comprises a retention inserter 311B and a coupling inserter 312B extended from the retention inserter 311B. The shape of the retention inserter 311B is designed correspondingly to the shape coupling groove 25. The retention inserter 311B has a retention surface 3111B and a biasing surface 3112B, wherein the retention surface 3111B is shaped and sized corresponding to the curved contacting surface 24. When the retention inserter 311B is slidably engaged with the coupling slot 20, the retention surface 3111B of the retention inserter 311B is biased against the curved contacting surface 24 to securely retain the second connector 30B at the predetermined location of the respective lens 10. Accordingly, the thickness of the retention inserter 311B is smaller than a length of the coupling slot 20, such that when the retention inserter 311B is slidably inserted into the coupling slot 20 at the front side 11 of the lens 10, the retention inserter 311B is disposed within the coupling slot 20. Since the distance between the opening edges 21 is smaller than that the distance between the side surfaces 22, the retention inserter 311B is securely retained within the coupling slot 20 so as to prevent the lateral movement of the retention inserter 311B. In other words, the temple units 2 and the bridge 3 can be fastened with the lenses 10 as long as the outward movement of the second connectors 30B is avoided.

Accordingly, the coupling inserter 312B is extended from the retention inserter 311B. More specifically, the coupling inserter 312B is protruded from the retention inserter 311B, wherein the coupling inserter 312B is made of flexible material and is formed with an outer threaded circumferential surface 313B, such that the coupling inserter 312B is adapted to be selectively cut by a tool or other cutting equipment to reduce the length of the coupling inserter 312B.

The fastening element 32B, having a ring shape, is arranged to engage with the coupling inserter 312B. When the retention member 31B of the second connector 30B is inserted into the coupling slot 20 at the front side 11 of the lens 10, the fastening element 32B is rotatably engaged with the outer threaded circumferential surface 313B of the coupling inserter 312B at the rear side 12 of the lens 10, so as to securely lock up the fastening element 32B at the rear side 12 of the lens 10. In other words, the first and second connectors 20, 30B provide a fast and firm connection to couple the temple units 2 and the bridge 3 with the lenses 10. Thereafter, a portion of the coupling inserter 312B rearwardly protruding out of the fastening element 32B can be cut to reduce the length of the coupling inserter 312B so as to allow the fastening element 32B tightly engaging with the coupling inserter 312B and avoid exposure of unused portion of the coupling inserter 312B, as shown in FIG. 11.

Figure 12:
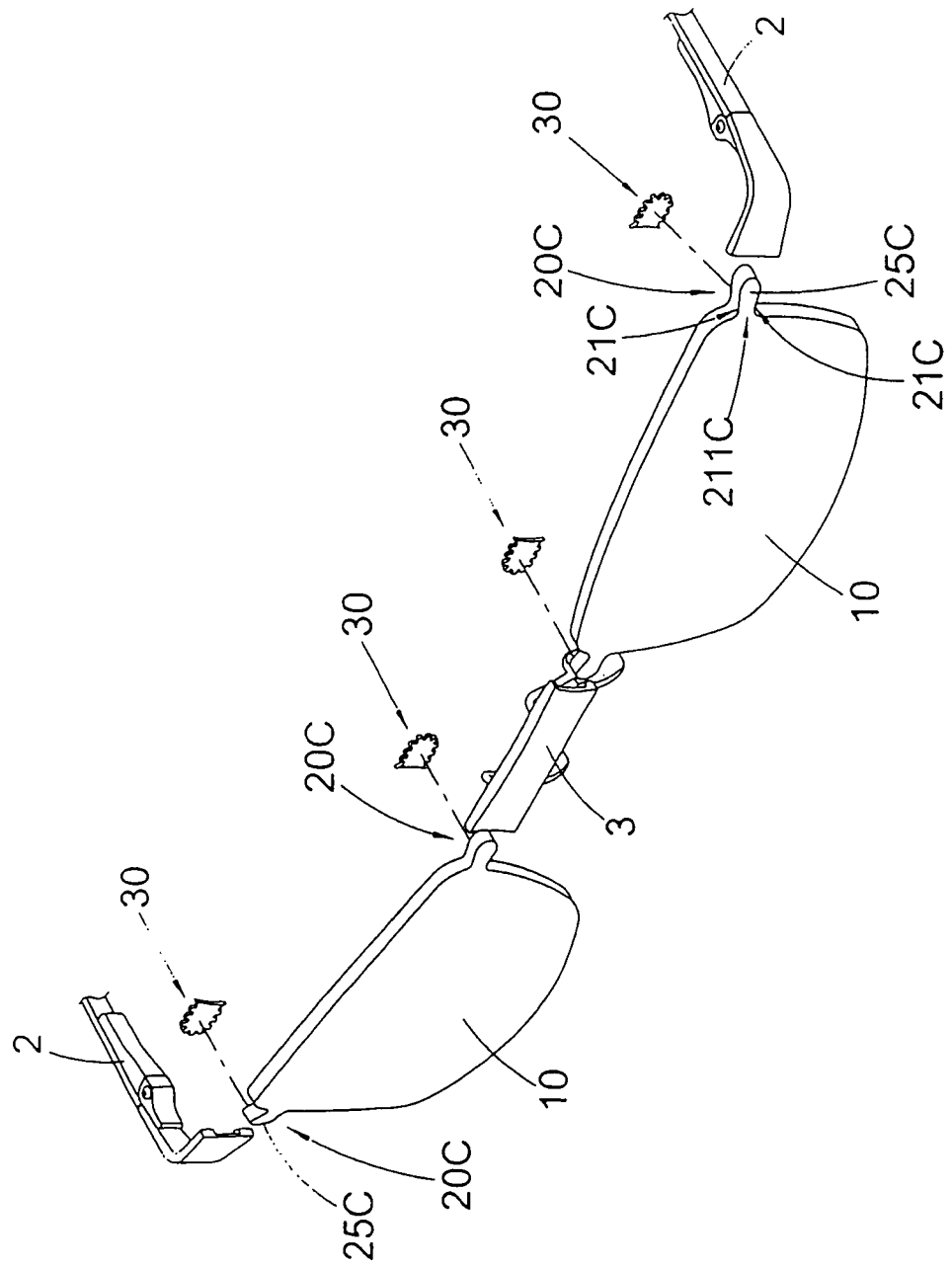
FIG. 12 is an exploded perspective view of the rimless spectacles according to a fourth embodiment of the present invention.
Figure 13:
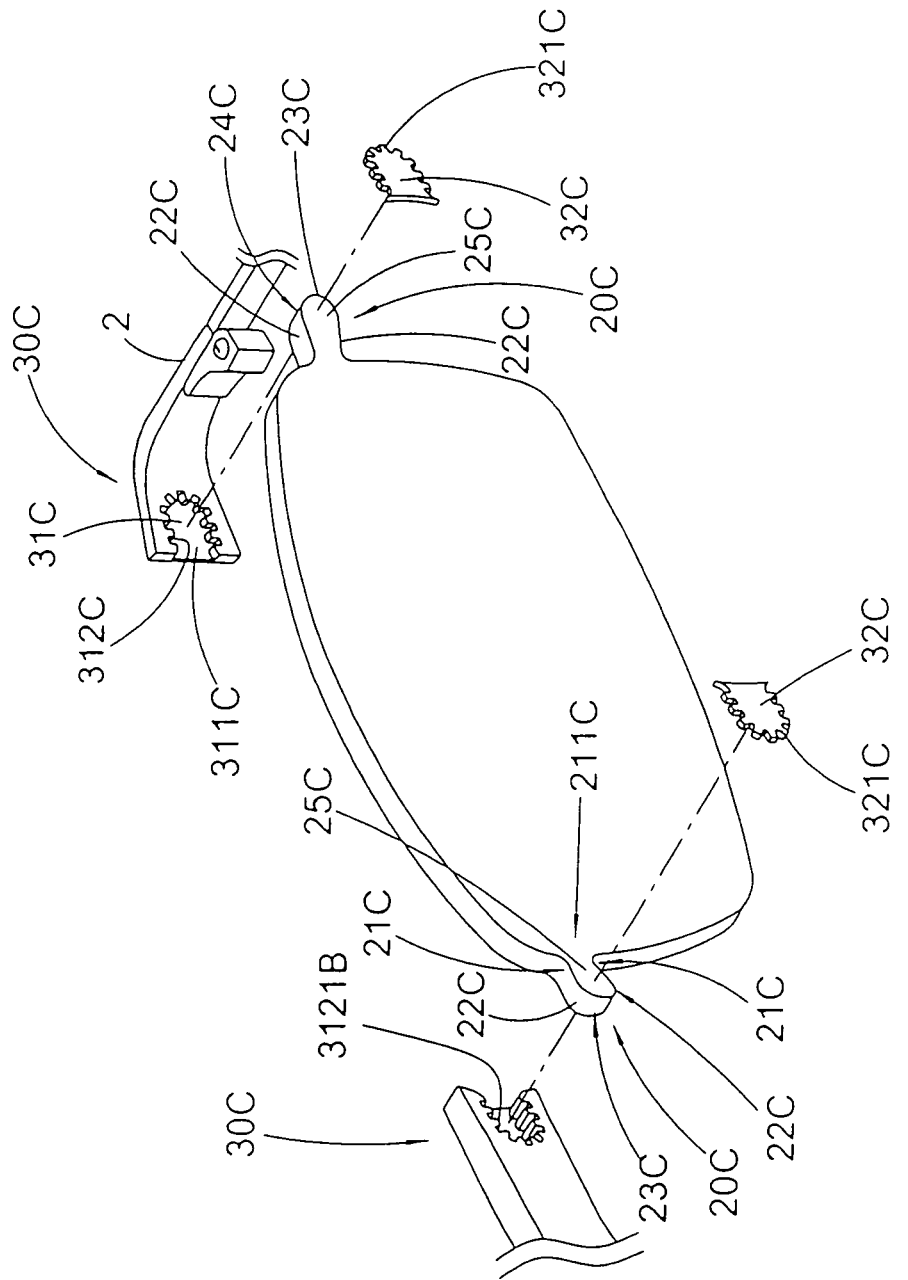
FIG. 13 is an exploded view of the rimless spectacles according to the fourth embodiment of the present invention, illustrating the relationship between the first and second connectors.
Figure 14:
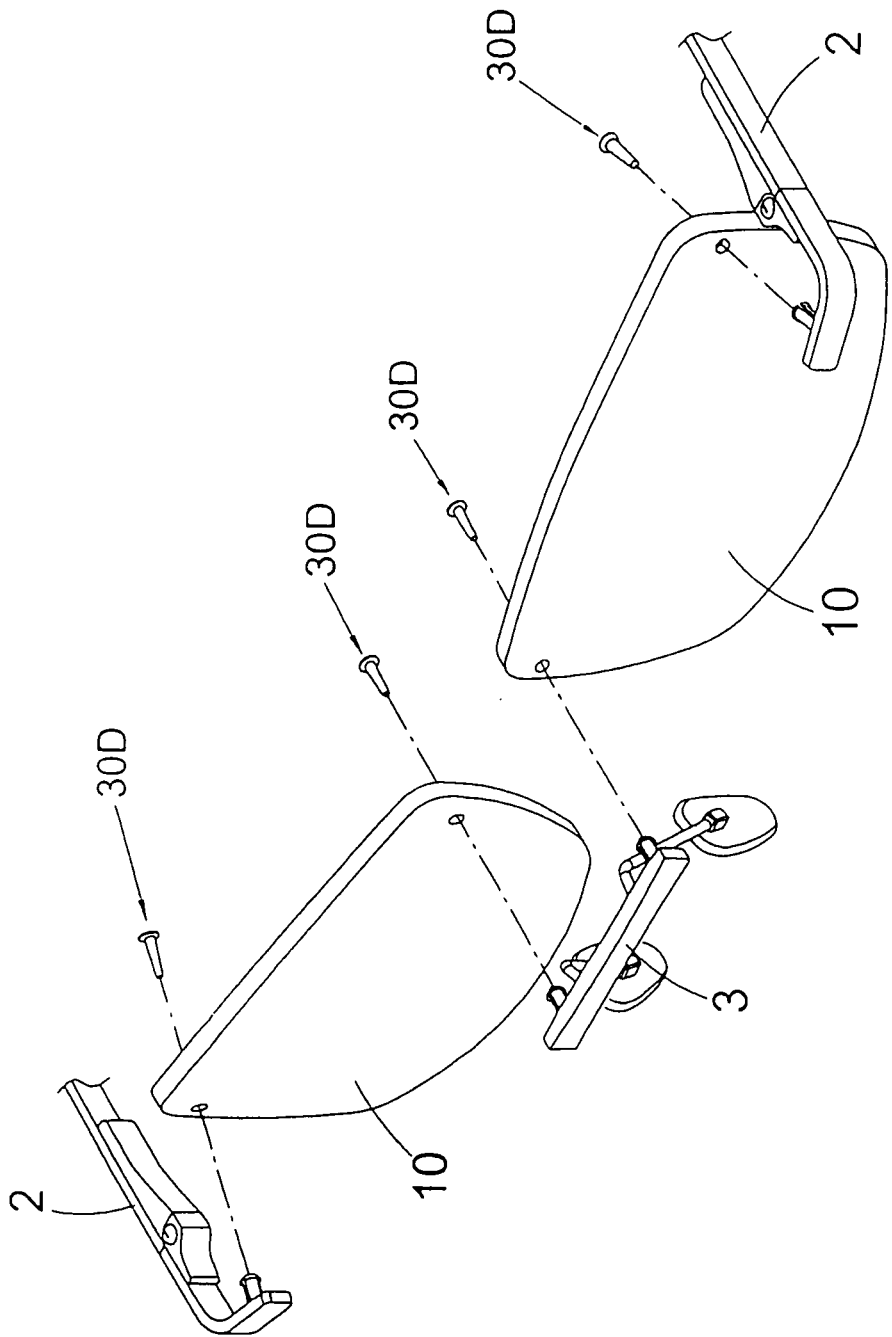
FIG. 14 is an exploded perspective view of the rimless spectacles according to a fifth embodiment of the present invention.
Figure 15:
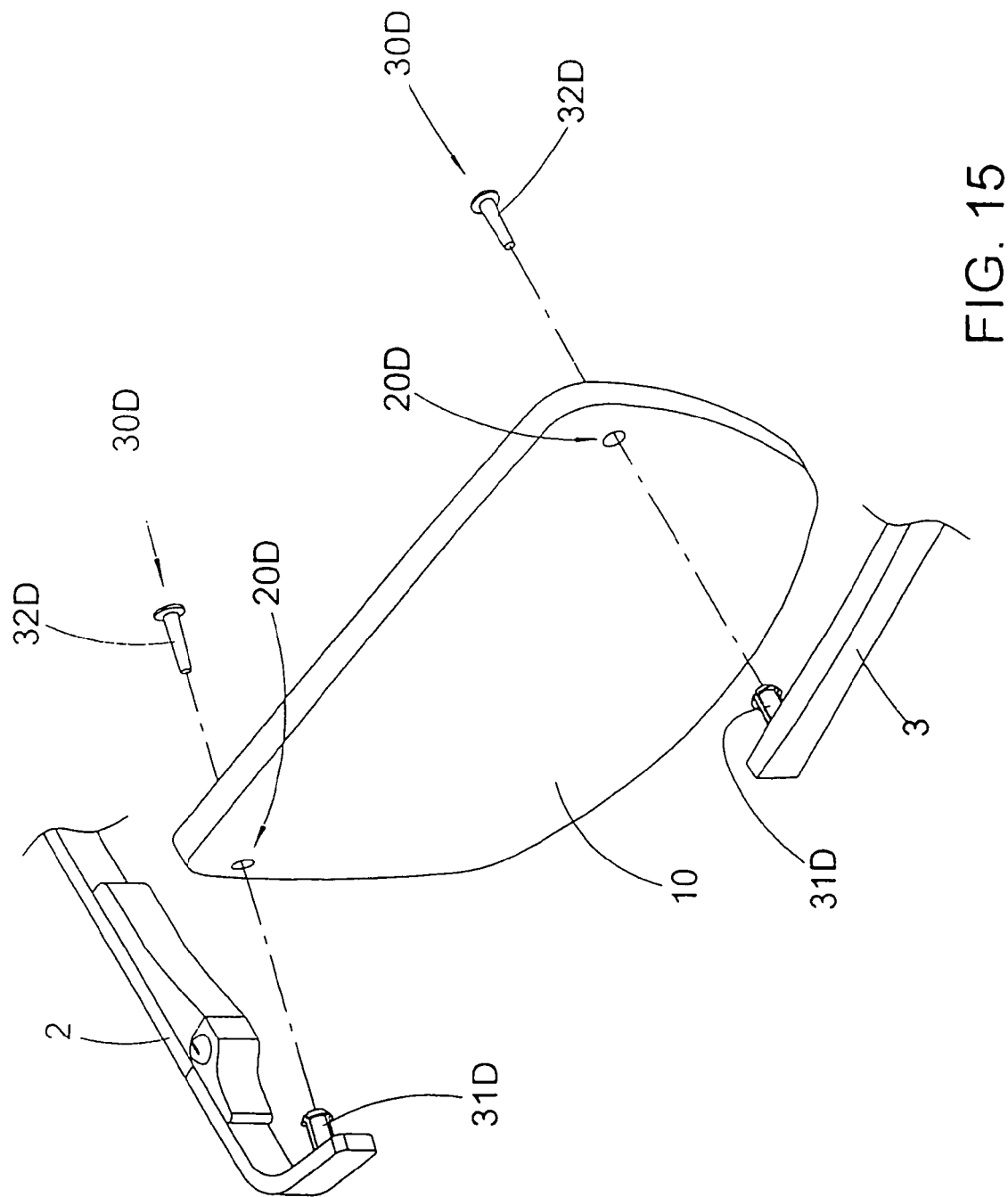
FIG. 15 is an exploded view of the rimless spectacles according to the fifth embodiment of the present invention, illustrating the relationship between the first and second connectors.

As shown in FIGS. 12 to 13, the rimless spectacles of a fourth embodiment illustrate an alternative mode of the first embodiment of the present invention. Each of the first connectors 20C is an engaging arm 20 integrally and outwardly protruded from the peripheral edge 13 of the respective lens 10, wherein each of the engaging arm 20C has two engaging edges 21C formed at the peripheral edge 13 of the respective lens 10. The engaging edges 21C are provided at the peripheral edge 13 with a predetermined separating distance 211C.

Each of the engaging arms 20C further has two engaging surfaces 22C and an arc surface 23C, wherein the two engaging surfaces 22C, which are the two lateral surfaces of the engaging arms 20C, are extended from the engaging edges 21C respectively. The distance between the two engaging surfaces 22C is larger than the separating distance 221C between the two engaging edges 21C.

The arc surface 23 is integrally extended between the two engaging surfaces 22C to form a curved contacting surface 24C from one of the engaging surfaces 22C to another engaging surface 22C through the arc surface 23. In addition, a protrusion connector 25C is formed by the encirclement of the curved contacting surface 24C.

As shown in FIG. 13, the second connectors 30C are provided at the temple units 2 and the bridge 3 respectively, wherein each of the second connectors 30C has a coupling groove 31C and a retention panel 32C. In other words, the coupling grooves 31C are indently formed at the predetermined locations of the temple units 2 and the bridge 3 respectively. Accordingly, each of the coupling grooves 31C has a bottom wall 311C and a peripheral wall 312C biasing against the curved contacting surface 24C, wherein a plurality of engaging teeth 3121C are formed at the peripheral wall 312C.

The retention panel 32C is shaped and sized corresponding to the coupling groove 31C such that the retention panel 32C can be fitted into the coupling groove 31C. In addition, a plurality of retention teeth 321C are formed at the retention panel 32C to engage with the engaging teeth 3121C when the retention panel 32C is engaged with the coupling groove 31C. Therefore, after the protrusion connector 25C of the engaging arm 20C is slidably engaged with the respective coupling groove 31C, the retention panel 32C is then engaged with the coupling groove 31C at the rear side 12 of the lens 10 to sandwich the engaging arm 20C between the bottom wall 311C of the coupling groove 31C and the retention panel 32C, so as to securely and rapidly couple the temple units 2 and the bridge 3 with the lenses 10. It is worth to mention that an adhesive can be applied to the engaging arms 20C to affix to the coupling grooves 31C respectively to hold the engaging arms 20C in position.

Figure 18:
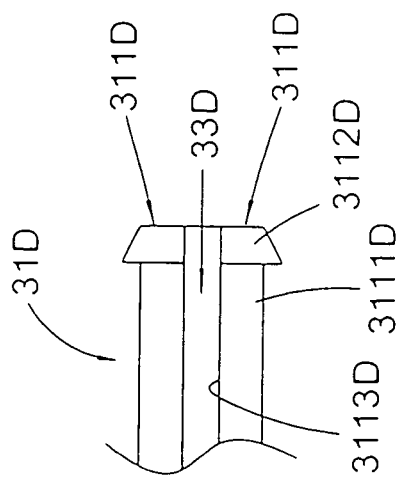
FIG. 18 is a schematic view of the second connector of the rimless spectacles according to the fifth embodiment of the present invention.
Figure 17:
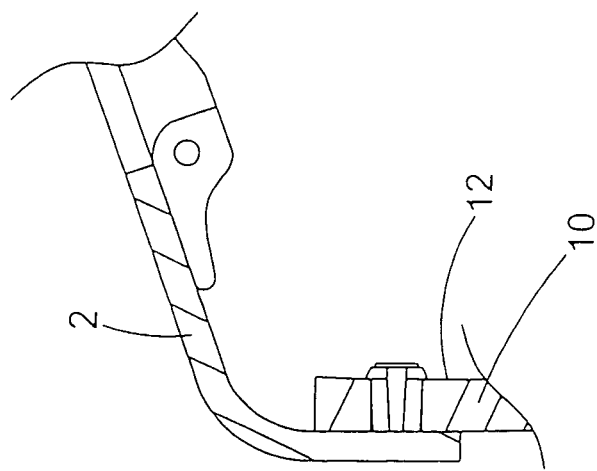
FIG. 17 is a sectional view of the structure of the rimless spectacles according to the fifth embodiment of the present invention, illustrating the connection between the first and second connectors.
Figure 16:
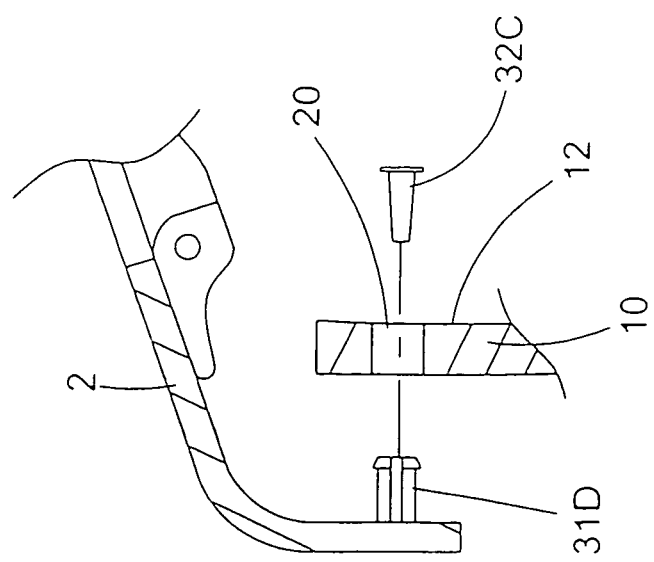
FIG. 16 is a sectional view of the structure of the rimless spectacles according to the fifth embodiment of the present invention, illustrating the relationship between the first and second connectors.

As shown in FIGS. 14 to 17, the rimless spectacles of a fifth embodiment illustrate an alternative mode of the first embodiment of the present invention. The first connector 20D is a through engaging slot 20D provided at the predetermined location of the lens 10. Each of the second connectors 30D comprises a connecting member 31D and a retention member 32D, wherein the connecting members 31D are provided at the predetermined locations of the temple units 2 and the bridge 3 respectively. Accordingly, each of the connecting members 31D is made of elastic material such as plastic. As shown in FIG. 18, each of the connecting members 31D comprises an elastic inserter 311D having a tubular structure, wherein each of the elastic inserter 311D has an elongated body 3111D, an enlarged head 3112D extended from an end of the elongated body 3111D, and an inner circumferential surface 3113D. In other words, the elongated body 3111D and the enlarged head 3112D of each of the elastic inserter 311D form an inserting plug. In addition, an inserting cavity 33D is formed within the inner circumferential surface 3113D of each of the elastic inserter 311D. In other words, when the elastic inserter 311D is slidably passed through the respective engaging slot 20D at the front side of the lens 10, the enlarged head 3112D is located at the rear side of the lens 10.

Each of the retention members 32D is slidably inserted into the inserting cavity 33D of the respective elastic inserter 311D. Accordingly, after the elastic inserter 311D is slidably inserted through the respective engaging slot 20D at the lens 10, the retention members 32D is then slidably inserted into the inserting cavity 33D of the respective elastic inserter 311D at the rear side of the lens 10 so as to apply an outward pushing force against the elastic inserter 311D. Therefore, the temple units 2 and the bridge 3 can be securely coupled with the lenses 10D to form the rimless structure.

Figure 19:
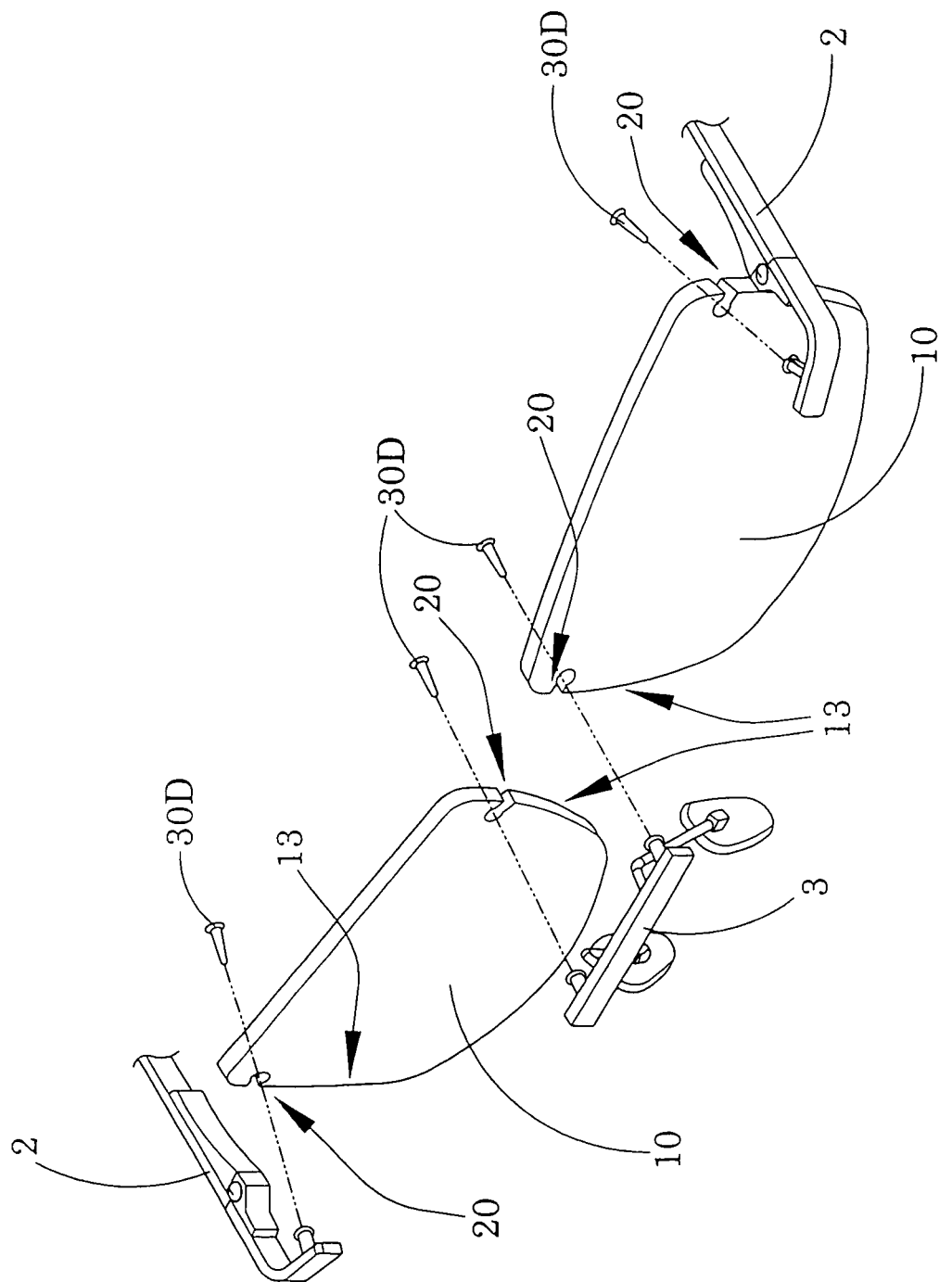
FIG. 19 illustrates an alternative mode of the rimless spectacles according to the above fifth embodiment of the present invention.
Figure 20:
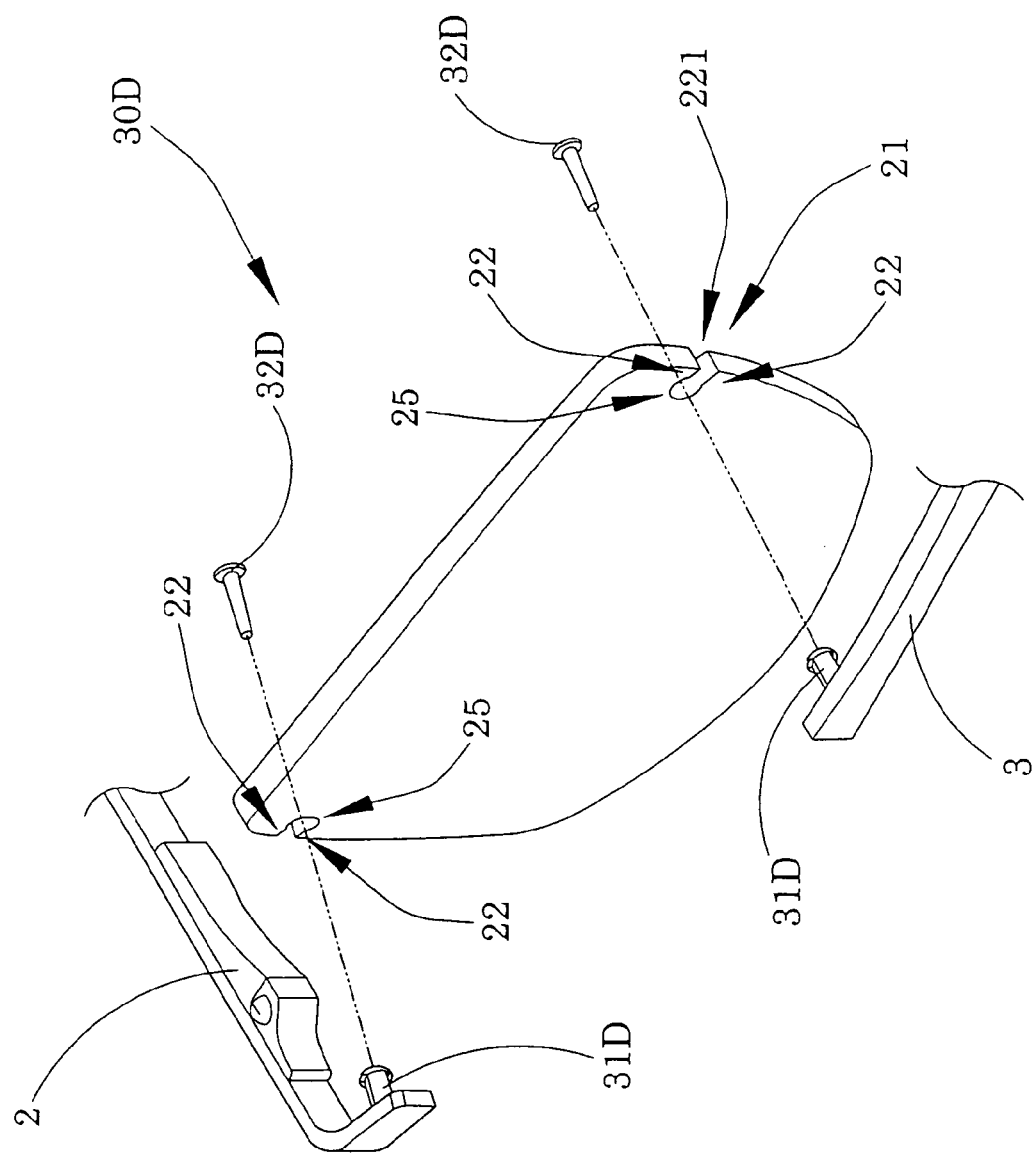
FIG. 20 is an exploded view of the alternative mode of the rimless spectacles according to the fifth embodiment of the present invention.
Figure 21:
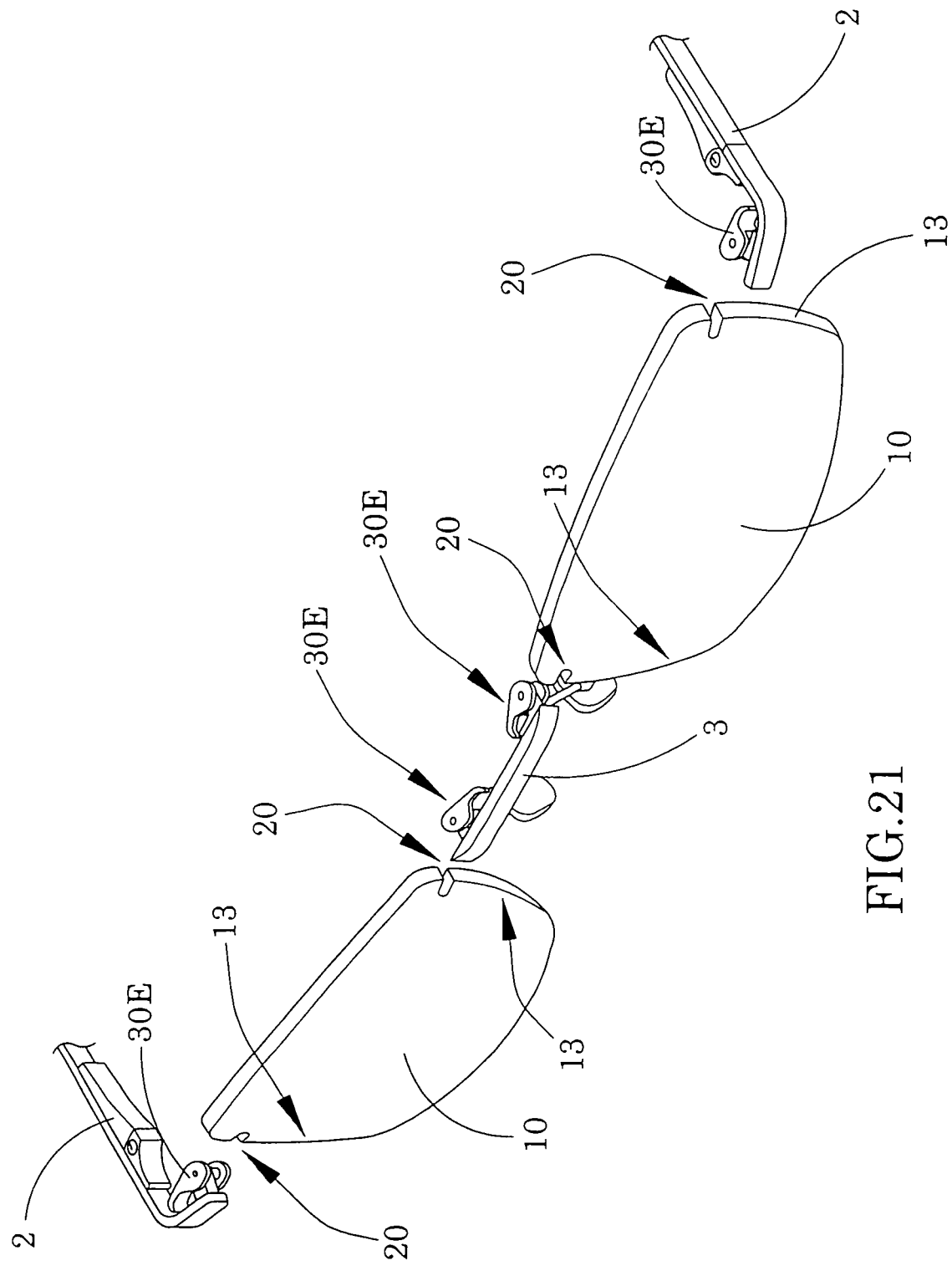
FIG. 21 is an exploded perspective view of the rimless spectacles according to a sixth embodiment of the present invention.
Figure 22:
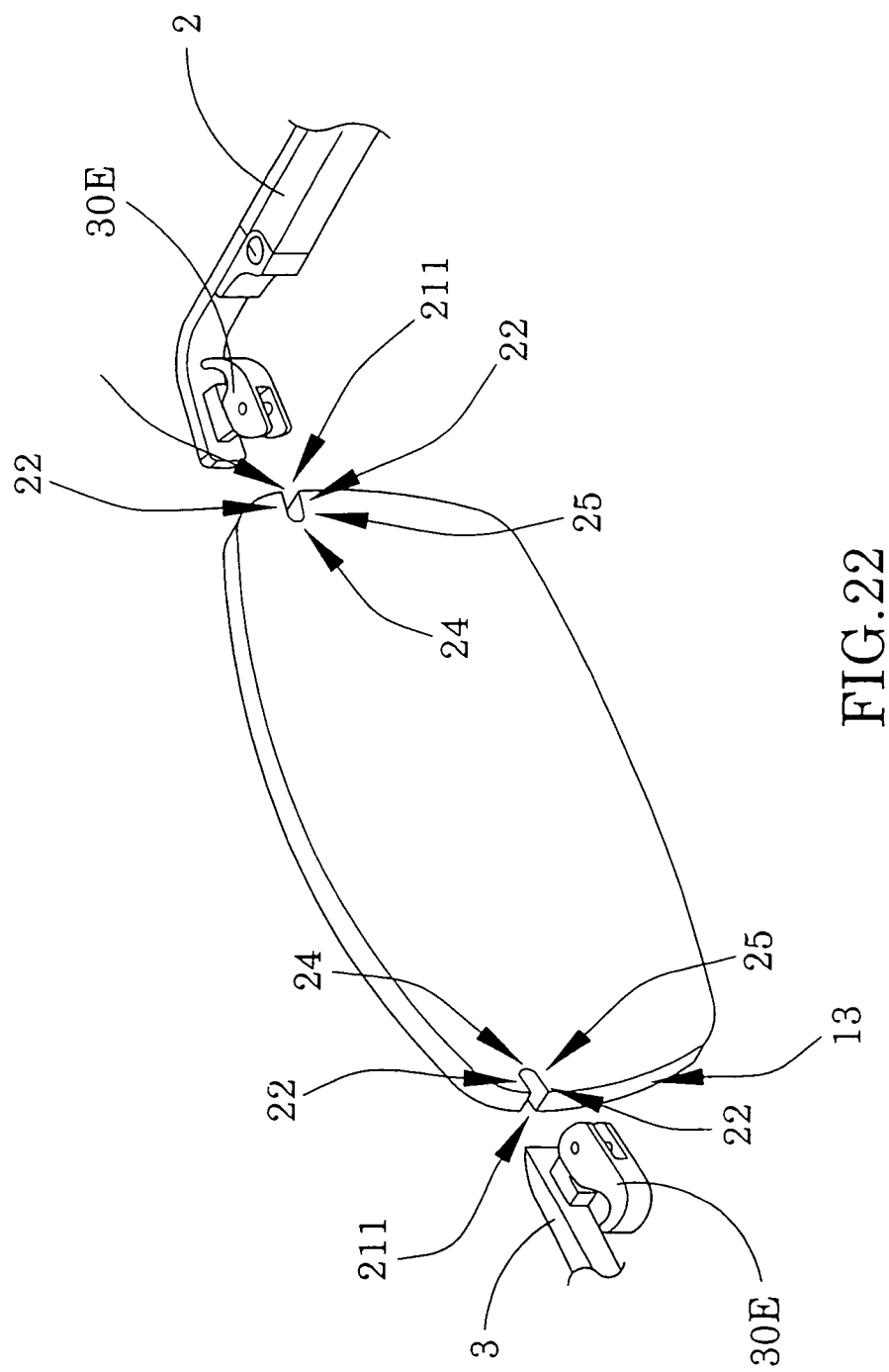
FIG. 22 is an exploded perspective view of the structure of the rimless spectacles according to the sixth embodiment of the present invention.

FIGS. 19 and 20 illustrate an alternative mode of the rimless spectacles of the fifth embodiment, wherein the second connectors 30D is adapted to incorporate with the first connector 20 as shown in FIG. 3. As shown in FIGS. 3, 19, and 20, each of the first connectors 20 is a coupling slot 20 indently formed at the peripheral edge 13 of the respective lens 10 to define the opening edges 21 and the coupling groove 25. As it is mentioned above, the distance between the two side surfaces 22 is larger than the distance between the two opening edges 21 such that the width of the opening 211 is smaller that the distance between the two side surfaces 22. Preferably the coupling groove 25 has a size slightly larger than the circumferential size of the elastic inserter 311D.

When the elastic inserter 311D is slidably passed through the respective coupling slot 20 at the front side of the lens 10, the enlarged head 3112D is located at the rear side of the lens 10. In particularly, the elongated body 3111D of the elastic inserter 311D is biased against the side surfaces 22 of the coupling slot 20 when the retention member 32D is slidably inserted into the inserting cavity 33D of the respective elastic inserter 311D. It is worth to mention that the size of the elastic inserter 311D does not require to precisely match with the size of the coupling slot 20 in order to mount the elastic inserter 311D to the coupling slot 20. In other words, the size of the coupling slot 20 can be made not to precisely match with the elastic inserter 311D so as to reduce the manufacturing cost and defect of the optical lens 10 in responsive to the coupling slot 20.

FIGS. 21 to 24 illustrate an alternative mode of the rimless spectacles of the second embodiment. As shown in FIGS. 21 to 24, each of the second connectors 30E comprises a connecting member 31E and a clipping member 32E, wherein the connecting members 31E are provided at the temple units 2 and the bridge 3 respectively. Each of the connecting members 31A comprises a retention inserter 311E and a coupling shaft 312E, wherein the retention inserter 311E has a shape and size corresponding to the shape and size of the respective coupling slot 25. Each of the retention inserters 311E has a retention surface 3111E and a biasing surface 3112E, wherein the retention surface 3111E is shaped and sized corresponding to the curved contacting surface 24. When the retention inserter 311E is slidably inserted into the corresponding coupling slot 20 inwardly from the peripheral edge 13 of the lens 10, the retention surface 3111E of the retention inserter 311E is biased against the curved contacting surface 24 to securely retain the second connector 30E at the predetermined location of the respective lens 10.

Accordingly, the coupling shaft 312E is coupled with the retention inserter 311E. More specifically, the coupling shaft 312E is coupled with the retention inserter 311E to bias against the biasing surface 3112E thereof.

The clipping member 32E is pivotally engaged with connecting member 31E, wherein the clipping member 32E comprises a pressuring clipper 321E and a trigger 322E. The pressuring clipper 321E is pivotally coupled with the coupling shaft 312E of the connecting member 31E while the trigger 322E is extended from the pressuring clipper 321E. When the connecting member 31E of the second connector 30E is slidably inserted into the coupling slot 20 at the peripheral edge 13 of the lens 10, the trigger 322E is actuated to pivotally move the pressuring clipper 321E to bias against the biasing surface 3112E at the rear side 12 of the lens 10 such that temple units 2 and the bridge 3 can be quickly and firmly engaged with the lenses 10 by the clipping force.

Figure 23:
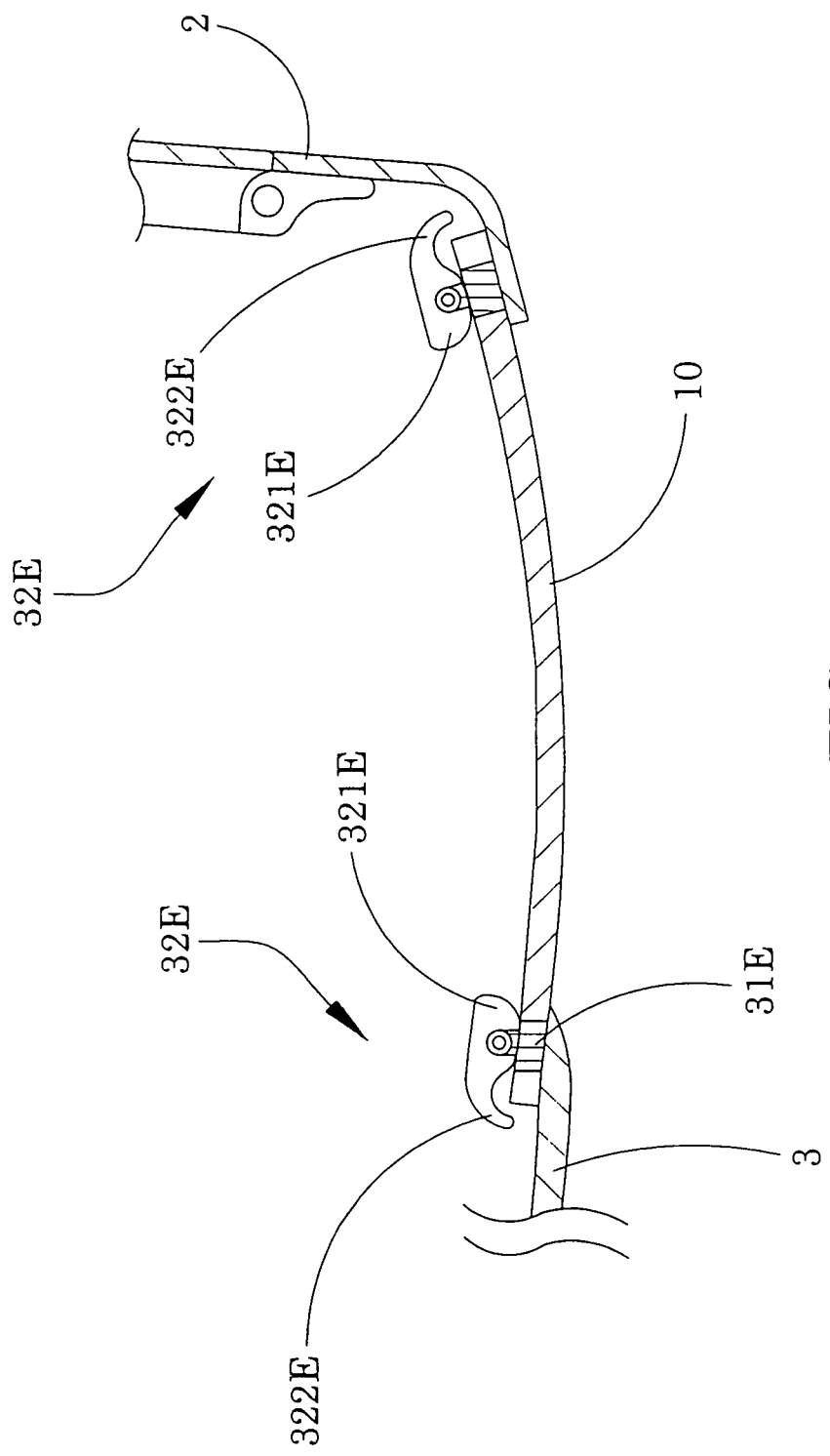
FIG. 23 is a sectional view of the structure of the rimless spectacles according to the sixth embodiment of the present invention.

Accordingly, the only difference between the second and sixth embodiments is that the direction of the trigger 332A, 322E. Comparing FIG. 7 with FIG. 23, the trigger 322A of the second embodiment has a curved shape curving away from the optical lens 10. In other words, the tip of the trigger 322A is pointing away from the optical lens 10. According to the sixth embodiment, the trigger 322E has a curved shape curving towards the optical lens 10 such that the tip of the trigger 322E is located adjacent to the peripheral edge 13 of the lens 10 as shown in FIG. 23.

Therefore, the four second connectors 30E are aligned and located close to the peripheral edges 13 of the lenses 10 at the inner and outer sides thereof respectively so as to enhance the aesthetic appearance of the rimless spectacles and to enhance the actuating operation of each of the second connectors 30E.

Figure 25:
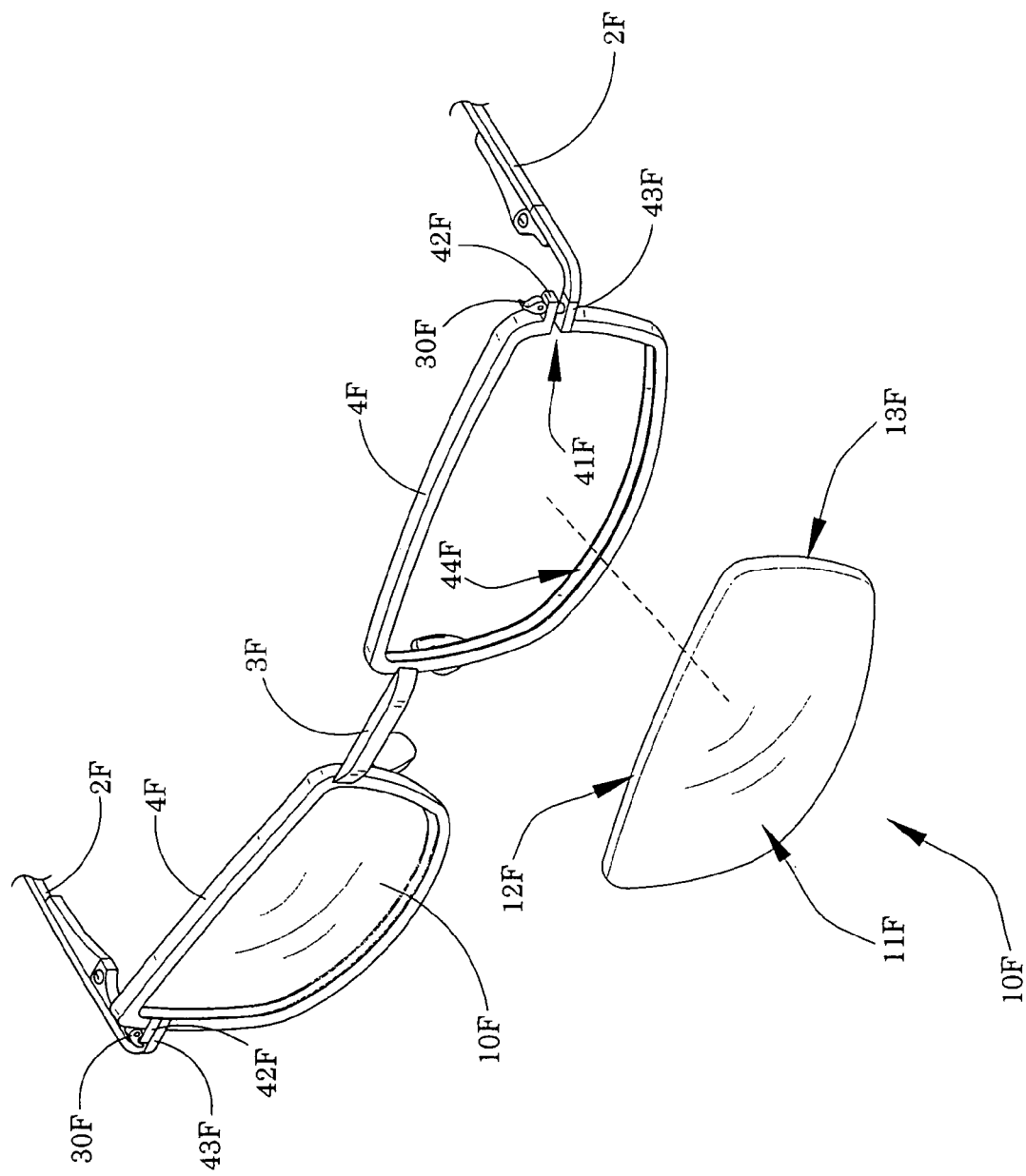
FIG. 25 is a schematic view of the structure of the spectacles according to a seventh embodiment of the present invention, illustrating the connection mechanism incorporating with the rim-type spectacles.
Figure 26:
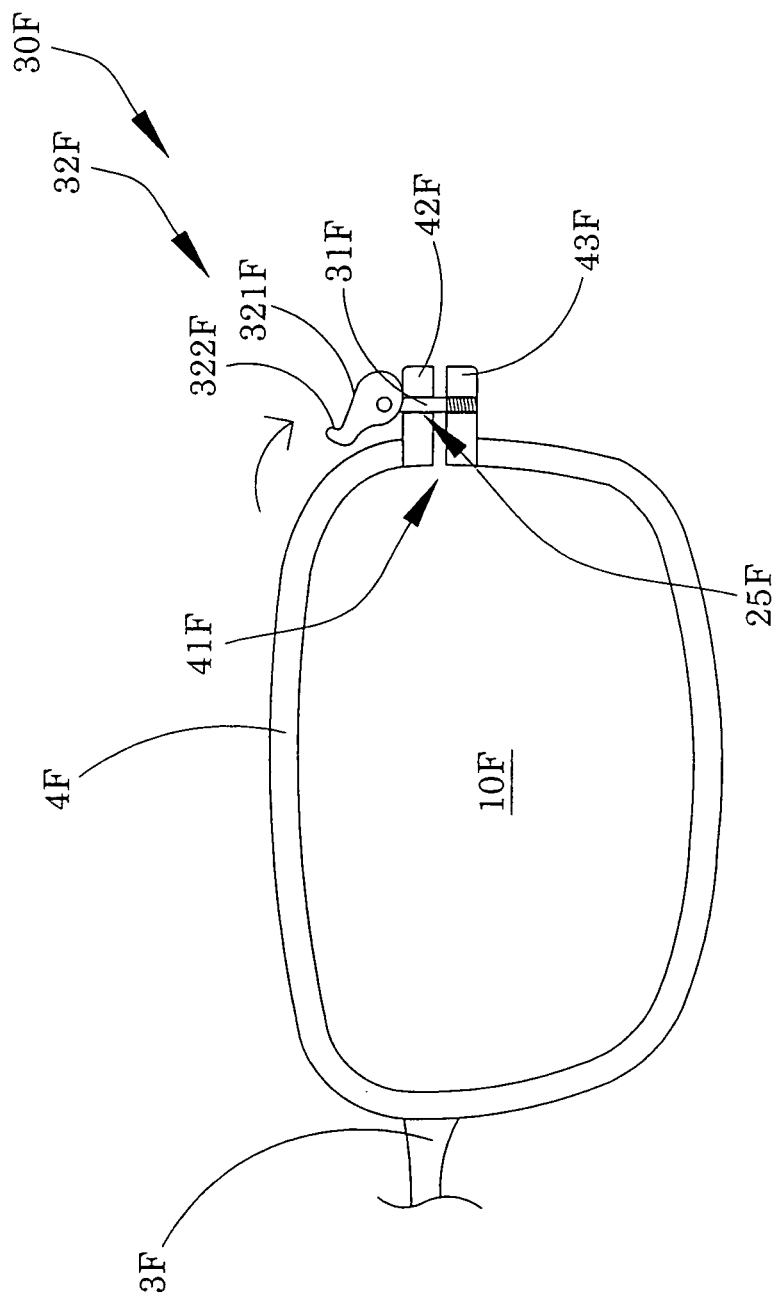
FIG. 26 is a schematic view of the spectacles according to the above seventh embodiment of the present invention, illustrating the connection mechanism incorporating with the lens rim.
Figure 27:
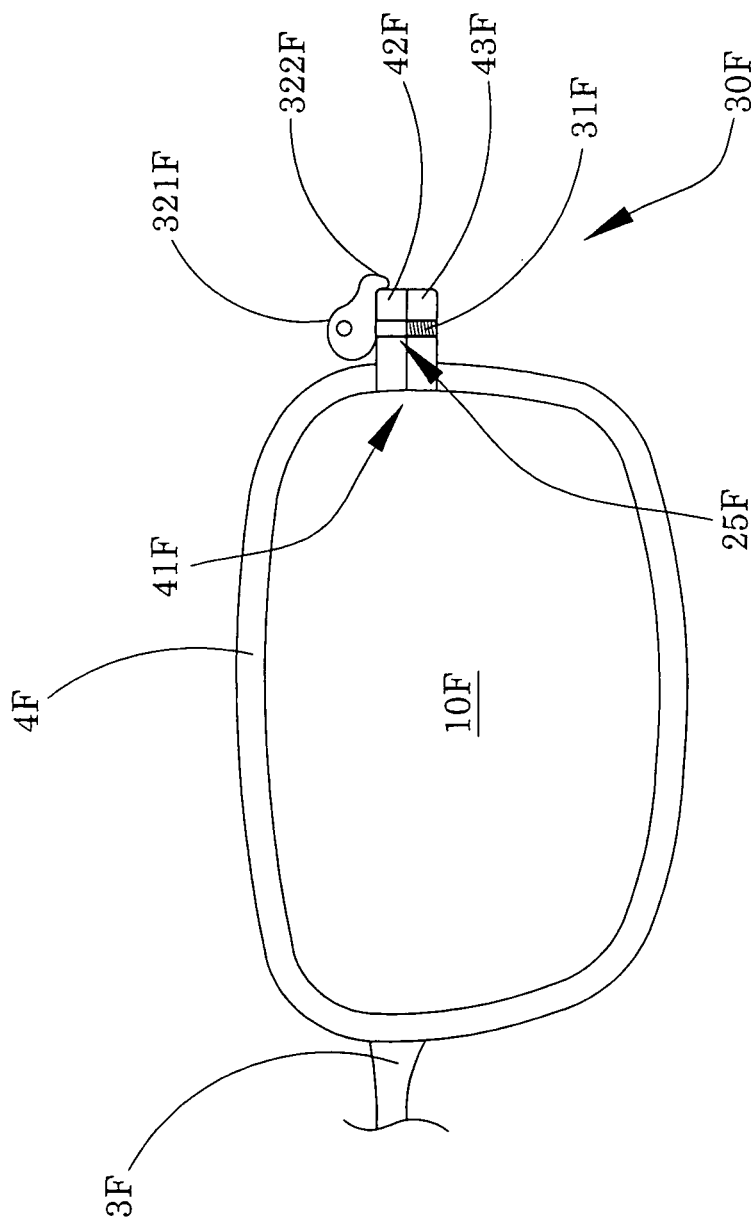
FIG. 27 is a schematic view of the spectacles according to the above seventh embodiment of the present invention, illustrating the lens being secured at the lens rim via the connection mechanism.

FIGS. 25 to 27 illustrate an alternative mode of the spectacles of the sixth embodiment, wherein the spectacles is the rim-type spectacle incorporating with the connection mechanism. As shown in FIG. 25, the spectacles comprise two lenses 10F. Each of the lenses 10F has a front side 11F, a back side 12F, and a peripheral edge 13F located between the laterals of front and the rear sides 11F, 12F.

The spectacles further comprise a frame which comprises two lens rims 4F encirclingly holding around the peripheral edges 13F of the lenses 10F respectively, two temple units 2F extended from two outer sides of the lens rims 4F respectively, and a bridge 3F extended between two inner sides of the lens rims 4F respectively.

As shown in FIGS. 25 to 27, each of the lens rims 4F has a side opening 41F provided at the outer side to form a C-shaped structure and upper and lower engaging members 42F, 43F extended from two ends of the lens rim 4F at the side opening 41F, wherein when the upper and lower engaging members 42F, 43F are biased against each other via a second connector 30F to close the side opening 41F, the respective lens 10F is retained within the lens rim 4F. Preferably, each of the temple units 2F is extended from the respective lower engaging member 43F.

Each of the lens rims 4F further has a lens groove 44F indently provided at the inner surface of the lens rim 4F to engage with the peripheral edge 13F of the lens 10F. Therefore, when the side opening 41F is closed, the respective lens 10F is securely retained within the lens rim 4F.

Each of the second connectors 30F comprises a connecting member 31F and a clipping member 32F, wherein each of the connecting members 31F is coupled with the upper and lower engaging members 42F, 43F. The connecting member 31F has one end coupling with the lower engaging member 43F and an opposed end slidably extending through the upper engaging member 42F to pivotally couple with the clipping member 32F. Accordingly, the respective end of the connecting member 31F is a threaded end securely engaging with the lower engaging member 43F, wherein the coupling slot 25F is formed through the upper engaging member 42F for the connecting member 31F slidably passing through the coupling slot 25F.

The clipping member 32F is pivotally engaged with connecting member 31F, wherein the clipping member 32F comprises a pressuring clipper 321F and a trigger 322F. The pressuring clipper 321F is pivotally coupled with the corresponding end of the connecting member 31F while the trigger 322F is extended from the pressuring clipper 321F. When the trigger 322F is actuated to pivotally move the pressuring clipper 321F to bias against the upper engaging member 42F, the upper engaging member 42F is pressed to bias against the lower engaging member 43F so as to close the side opening 41F of the respective lens rim 4F. Therefore, the lens 10F can be quickly and firmly retained within the respective lens rim 4F by the clipping force.

According to the above embodiments, the temple units 2 and the bridge 3 can be precisely and rapidly coupled with the lenses 10 via the above mentioned assembling structures. In addition, the lens 10 can be selectively cut in different styles according to the user's preference to incorporate with the temple units 2 and the bridge 3 via the above mentioned connection mechanisms. Therefore, there is no limitation of the lens, such as the shape, the size, or the thickness for incorporating with the connection mechanism.

Figure 28:
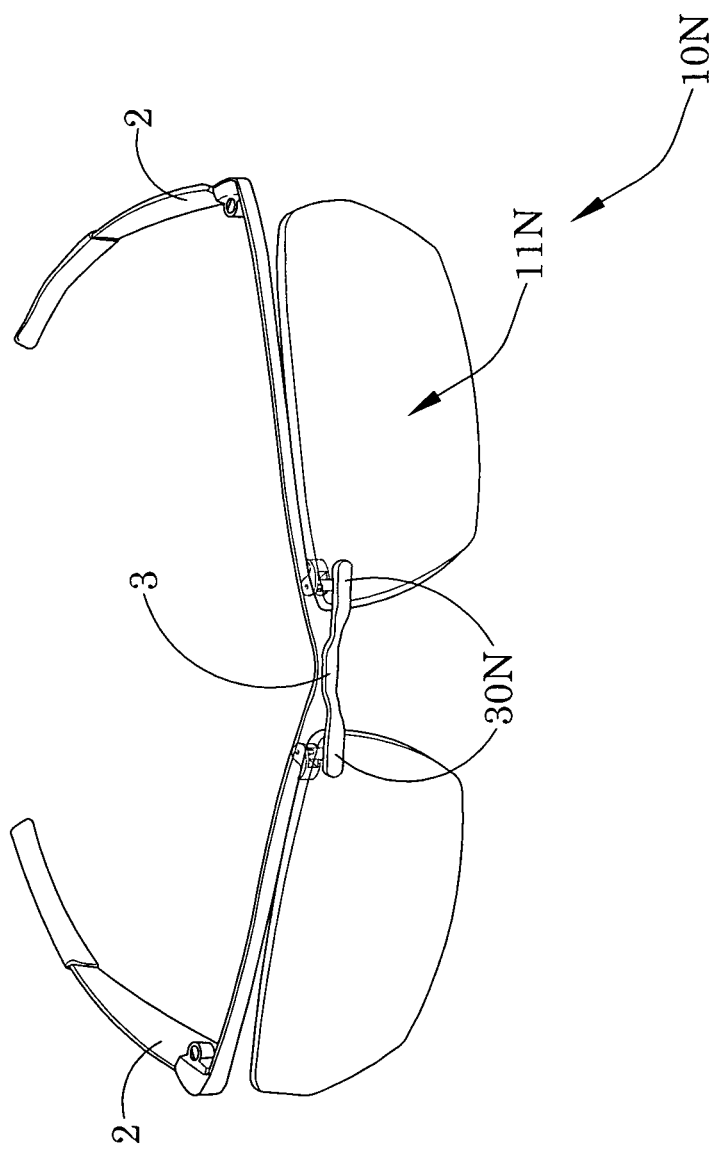
FIG. 28 is a perspective view of spectacles according to an eighth preferred embodiment of the present invention.
Figure 29:
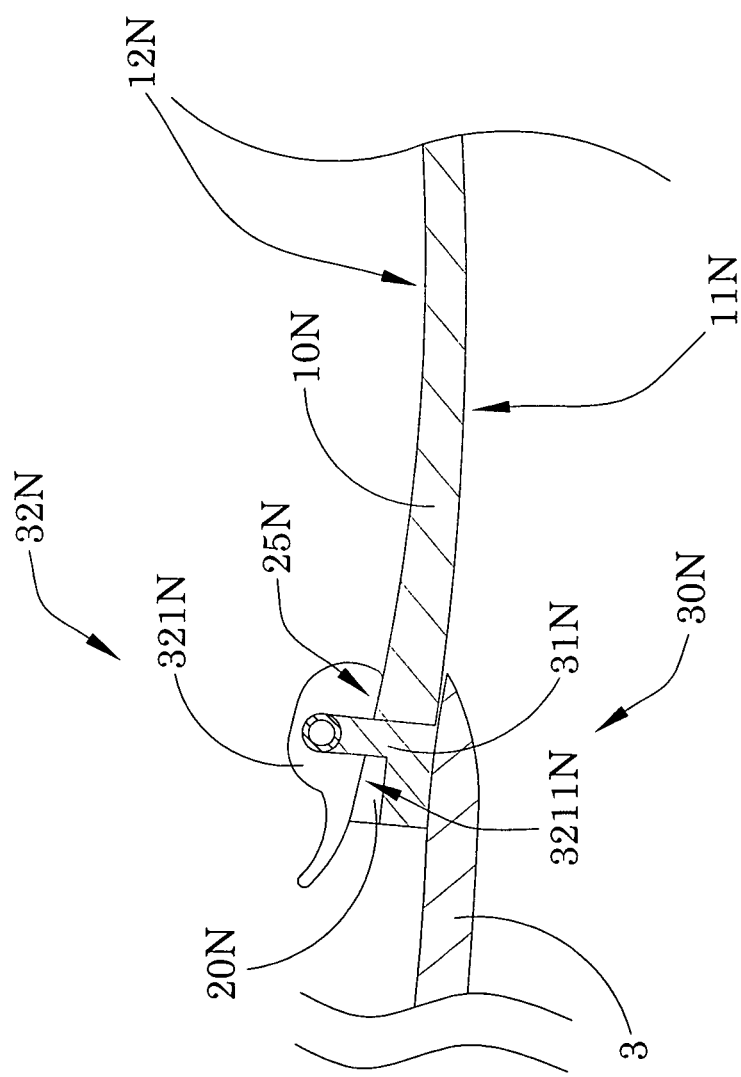
FIG. 29 is a side sectional view of the spectacles according to the above preferred embodiment of the present invention.
Figure 30:
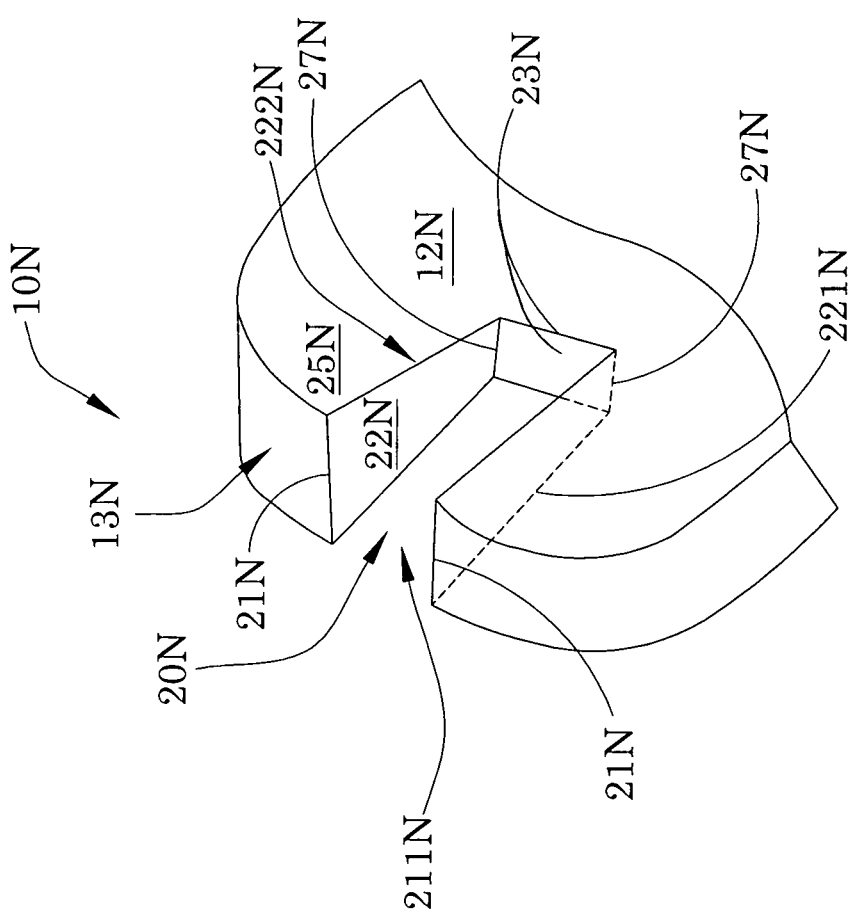
FIG. 30 is a 3-dimentional view of a lens of the spectacles according to the above preferred embodiment of the present invention.
Figure 31:
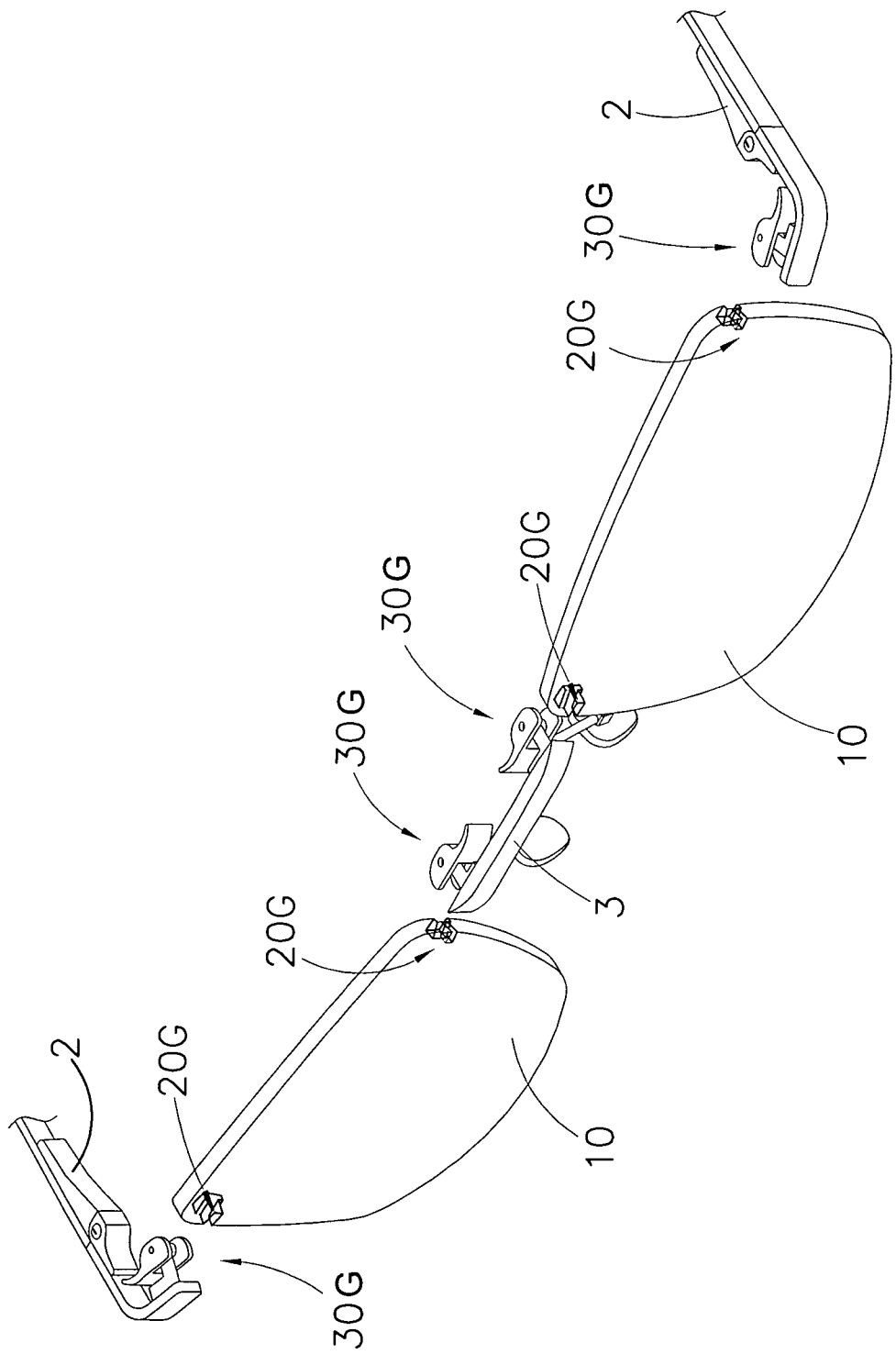
FIG. 31 is an exploded perspective view of the spectacles according to a nice preferred embodiment of the present invention.

Referring to FIG. 28 to FIG. 30 of the drawings, a spectacles according to a ninth preferred embodiment of the present invention is illustrated, wherein the spectacles comprises two lens 10N. Each of the lens has a front side 11N, a back side 12N, and a peripheral edge 13N located between the laterals of the front and the back side 11N, 12G. At least one of first connectors 20N of the connection mechanism are provided at the peripheral edges 13N of each of the lenses 10N respectively at the inner and/or the outer sides of each of the lenses 10N at the predetermined locations. In this embodiment, preferably two first connectors 20N are provided at two inner sides of each of the lenses 10N respectively. It is worth to mention that the first connectors 20N may be provided at the both inner side of the lenses 10N and/or both outer side of the lenses 10N; or any combination of the above.

The spectacles further comprise a frame which comprises two temple units 2 and a bridge 3. Accordingly, the bridge 3 is adapted to couple with two inner sides of the lenses 10N with the respect to the two first connectors 10N in the preferred embodiment. It should be noted that the temple units 2 may also be optionally arranged to correspondingly couple with two outer sides of the lenses 10N respectively depending on variety designs of the spectacles.

The spectacles further comprises a plurality of second connectors 30N of the connection mechanism provided at the bridge 3 and/or the temple units. In this embodiment, the second connectors 30N are provided at the two ends of the bridges for engaging with the first connectors 20N at the inner sides of the lenses 10N respectively. Therefore, the second connectors 30N engaged with the respective first connectors 20N are coupling the bridge 3 and the temple units 2 integrally extending from the bridge 3 with the lenses 10N. Thereby, the lenses 10N are able to simply and securely couple with the bridge 3 and the temple units 2 without complicated or precise drilling process.

As best shown in FIGS. 29 and 30, each of the first connectors 20N is a coupling slot 20N indently formed at the peripheral edge 13N of the respective lens 10N to define two spaced apart opening edges 21N at the peripheral edge 13N and an opening 211N between the opening edges 21N.

More specifically, the coupling slot 20N has a contacting surface 23N and two slot sidewalls 22N spacedly extended from the opening edges 21N toward the contacting surface 23N to define the coupling slot 20N therewithin. Each of the side surfaces 22N further has two front side edges 221N at the front side 11N of the lens 10N, and two opposed rear side edges 222N at the back side 12N of the lens 10N at a rear opening edge of the coupling slot 20N. A length of an outer edge 21N, which is defined at each of the opening edges 21N extending between respective front and rear side edges 221N, 222N of each of the slot sidewalls 22N is preferably larger than a length of an inner edge 27N of each of the slot sidewalls 22N defined between the slot sidewalls 22N and the contacting surface 23N. Therefore, at least one inclined shouldering surface 25N is formed at the back side 12N of the lens 10N adjacent to the side edges 222N of the slot sidewalls 22N at the rear opening edge of the coupling slot 20N.

The second connector 30N provided at the bridge 3 and/or the temple units 2 preferably comprises a connecting member 31N for slidably being received within the coupling slot 20N for engaging therewith and a retention member 32N for securely retaining the connecting member 31N at the coupling slot 20N for securely connecting the bridge 3 and the temple units 2 with the respective lenses 10N. The retention member 32N preferably has a biasing surface 3211N for biasing against the inwardly inclined shouldering surfaces 25N to retain or lock up the connecting member 31N at the coupling slot 20N.

The second connector 30N can be any of the above mentioned second connectors 30 for coupling with the coupling slot 20N of the first connector 20N. According to the preferred embodiment, the retention member 32N is illustrated as a clipping member 32N as one of the examples, wherein the retention member 32N pivotally coupling with the connecting member 31N preferably has a pressuring clipper 321N forming the biasing surface 3211N thereat for biasing against the shouldering surface 25N. The pressuring clipper 321N may be pivotally moved and actuated to bias against the shouldering surfaces 25N of the coupling slot 20N via an assisting tool, such as a hand tool for easily applying a pressing force to bias against the biasing surface 3211N at the pressing clipper 321N with the shouldering surface 25N; or via a trigger 322N, which is integrally extended from the pressing clipper 321N for being actuated to pivotally move the pressuring clipper 321N to bias against the shouldering surface 25N of the coupling slot 20N such that temple units 2 and the bridge 3 can be quickly and firmly engaged with the lenses 10N by the clipping force.

Figure 24:
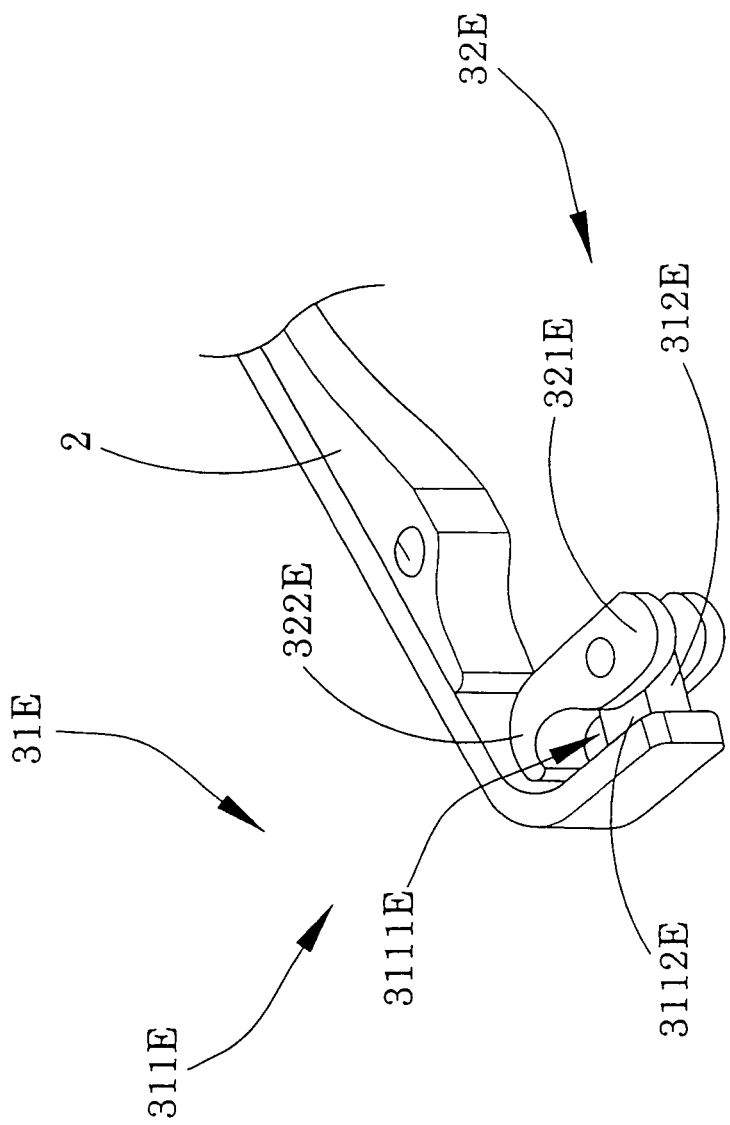
FIG. 24 is a schematic view of the second connector of the rimless spectacles according to the sixth embodiment of the present invention.

In other words, the connecting members 31N preferably has a shape and size corresponding to the shape and size of the coupling slot 20N for slidably inserted thereinto from the peripheral edge 13N toward the contacting surface 23N, so as to bias against the two slot sidewalls 22N and/or the contacting surface 23N to lock up the connecting member 31N at the coupling slot 20N via the retention member 32N, which is similar to the structure of the second connector 30E shown in FIG. 24.

It should be noted that the distance between the two slot sidewalls 22N may equal or slightly larger than the width of the opening 211N, which is the distance between the two opening edges 21N (outer edges 21N of the slot sidewalls 22N), so as to prevent the second connector 30N slid out of the coupling slot 20N. Alternatively, the distance between the two slot sidewalls 22N may be slightly smaller than the width of the opening 211N (a distance between the two opening edges 21G), so that it is relatively easier to slide the second connector 30N into the coupling slot 20N through the opening 211N thereof.

Accordingly, for a myopia lens, the thickness at the outer peripheral edge 13N thereof is thicker than the thickness around the central portion of the myopia lens, so that the length of the outer edge 21N of each of the slot sidewalls 22N located at the outer peripheral edge 13N is slightly larger than the inner edge 27N of each of the sidewalls 22N, so as to form the inclined shouldering surface 25N adjacent to the rear opening edge of the coupling slot 20N inwardly and frontwardly inclined from the peripheral edge 13N.

It is appreciated that the length of the outer edge 21N larger than the inner edge 27N is able to form the inwardly and frontwardly inclined shouldering surface 25N, so that the second connector 30N is able to securely coupling with the coupling slot 20N of the first connector 20N via the biasing surface 3211N biased contacting with the shouldering surface 25N. Therefore, the connecting member 31N is able to be securely locked up at the coupling slot 20N via the structure between the shouldering surface 25N and the retention member 32N.

Furthermore, the second connector 30N is able to bias against the inclined shouldering surface 25N to further prevent the second connector 30N being outwardly slid out of the coupling slot 20N. In other words, the relatively larger outer edge 21N of the slot sidewall 22N formed at the thicker peripheral edge 13N of the lens 10N effectively prevent the second connector 30N being outwardly slid along the shouldering surface 25N, so that the second connector 30N is able to firmly and stably couple with the first connector 20N to form a strong connecting force therebetween, so as to form the securely coupling structure between the lenses 10N and the frame of the spectacles.

Therefore, the coupling slot 20N inwardly indented from the peripheral edge 13N of the lens 10N, which has the length of the outer edge 21N longer than the inner edge 27N of each of the slot sidewalls 22N, is able to firmly associate with the second connector 30N without involving complicated or precise grinding or drilling process. The connection between the frame and the lenses 10N are simplified while strengthened the connecting force between the bridge 3 and/or the temple units 2 of the frame and the lenses 10N.

Referring to FIG. 31 to FIG. 34 of the drawings, a spectacles according to an ninth preferred embodiment of the present invention is illustrated, wherein the spectacles comprises two lens 10G. Each of the lenses 10G has a front side 11G, a back side 12G, and a peripheral edge 13G located between the laterals of front and the rear sides 11G, 12G. A plurality of first connectors 20G of the connection mechanism are spacedly provided at the peripheral edges 13G of the lenses 10G respectively at the inner and outer sides of each of the lenses 10G at the predetermined locations.

The spectacles further comprise a frame which comprises two temple units 2 and a bridge 3. The temple units 2 are arranged to correspondingly couple with two outer sides of the lenses 10G respectively, and the bridge 3 is adapted to couple with two inner sides of the lenses 10G respectively.

The spectacles, embodied as rimless spectacles, further comprises a plurality of second connectors 30G of the connection mechanism provided at the temple units 2 and the bridge 3 respectively, wherein the second connectors 30G are detachably engaged with the first connectors 20G at the lenses 10G to couple the temple units 2 and the bridge 3 with the lenses 10G to form the rimless spectacles without any tool.

Figure 32:
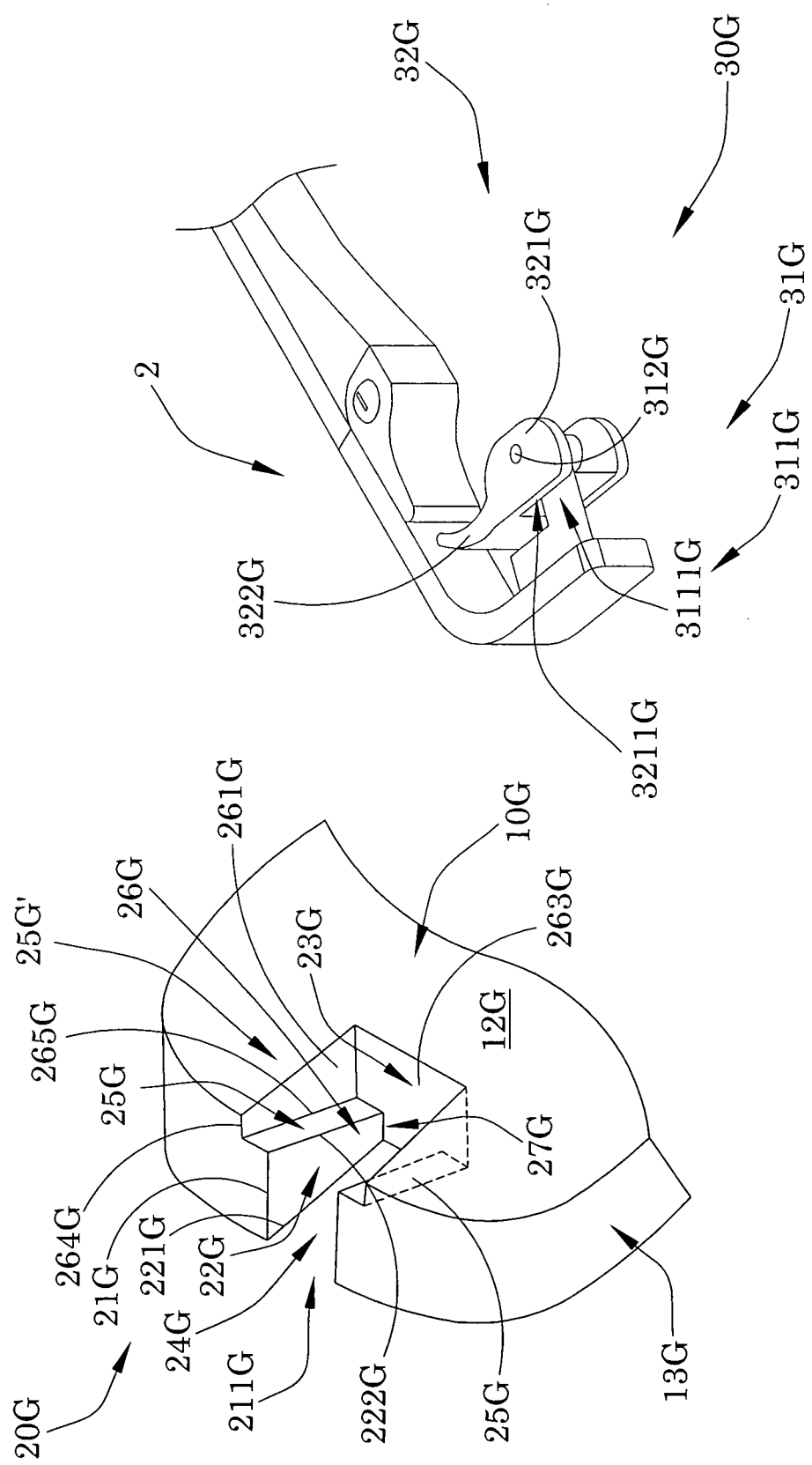
FIG. 32 is a perspective view of the coupling slot and the second connector of the spectacles according to the above mentioned embodiment of the present invention.
Figure 33:
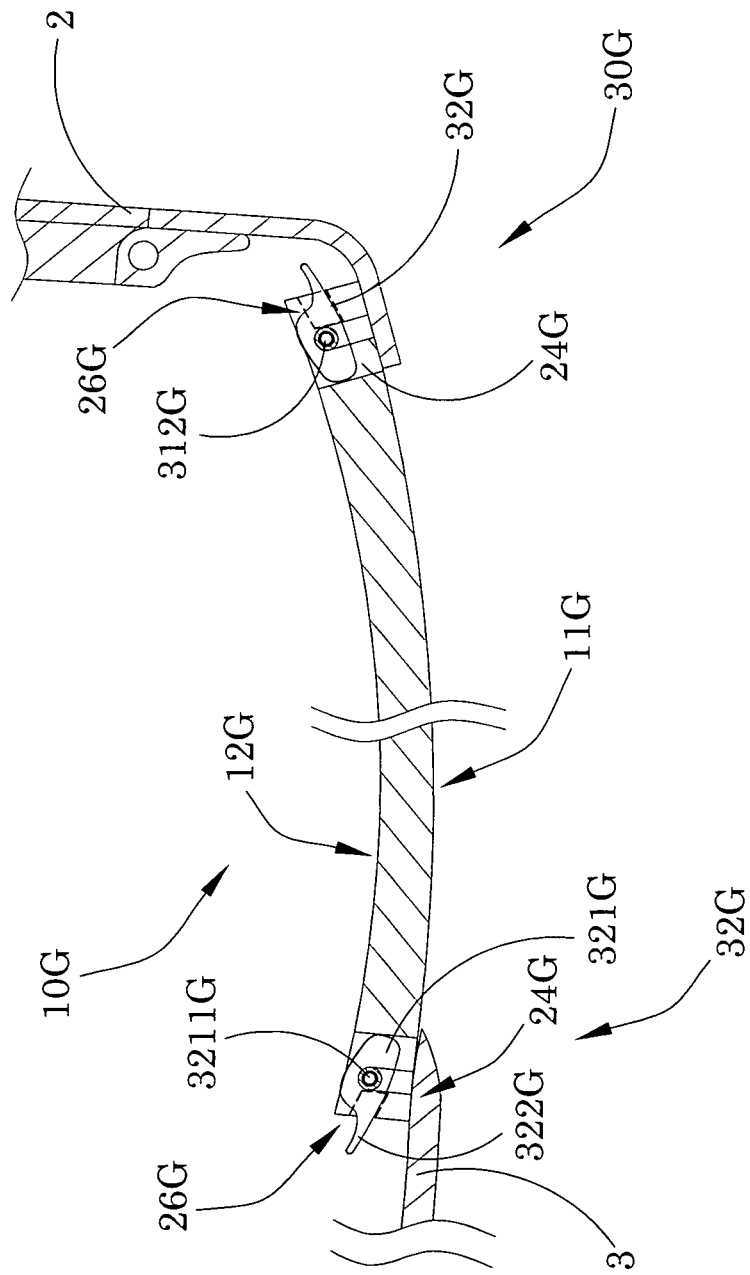
FIG. 33 is a sectional view of the structure of the spectacles according to the above mentioned embodiment of the present invention.

As best shown in FIGS. 32 and 33, each of the first connectors 20G is a coupling slot 20G indently formed at the peripheral edge 13G of the respective lens 10G to define two spaced apart first opening edges 21G at the peripheral edge 13G and a first opening 211G between the first opening edges 21G.

More specifically, the coupling slot 20G has a coupling groove 24G indently formed at the front side 11G of the lens 10G at the peripheral edge 13G thereof and defines two first side surfaces 22G and a contacting surface 23G extending therefrom to form the coupling groove 24G, wherein the two first side surfaces 22G are facing toward each other and are inwardly extended from two first opening edges 21G respectively. The distance between the two first side surfaces 22G are preferably parallel to each other to form the width of the first opening 211G substantially equal to the distance between the two first side surfaces 22G. In other words, the coupling groove 24G is defined within the two first side surfaces 22G and the contacting surface 23G.

Each of the side surfaces 22G further has a front side edge 221G at the front side 11G of the lens 10G, and an opposed rear side edge 222G defined between the front and back sides 11G, 12G of each of the lenses 10G.

Alternatively the distance between two first side surfaces 22G may slightly larger than the distance between the two first opening edges 21G such that the width of the first opening 211G is slightly smaller than the distance between the two side surfaces 22G for further preventing the second connector 30G slid out of the coupling groove 24G.

The coupling slot 20G further has a retention groove 26G frontwardly indented from the back side 12G of each of the lenses 10G at the peripheral edge 13G thereof to align with the coupling groove 24G. In other words, the coupling slot 20G is configured to have the coupling groove 24G at the front side 11G of the lens 10G and the retention groove 26G at the back side 12G of the lens 10G. In particular, the size of the coupling groove 24G is smaller than the size of the retention groove 26G.

The retention groove 26G has two side retention surfaces 261G extended from the back side 12G of the lens 10G and a retention contacting surface 263G extending therefrom to form the retention groove 26G, wherein the contacting surface 23G of the coupling groove 24G is integrally extended from the retention contacting surface 263G of the retention groove 26G.

Each of the retention grooves 26G further has two second opening edges 264G at the side retention surfaces 261G along the peripheral edge 13G of the respective lens 10G to form a second opening 265G of the retention groove 26G. In other words, the first opening 211G of the coupling groove 24G and the second opening 265G of the retention groove 26G are formed at the peripheral edge 13G of the lens 10G and are aligned with each other, wherein the first opening 211G of the coupling groove 24G is formed adjacent to the front side 11G of the lens 10G while the second opening 265G of the retention groove 26G is formed adjacent to the back side 12G of the lens 10G. In addition, the width of first opening 211G of the coupling groove 24G is smaller than the width of the second opening 265G of the retention groove 26G. The two side retention surfaces 261G of the retention groove 26G preferably parallel to each other to define a width of the retention groove 26G.

The coupling slot 20G further has two shouldering surfaces 25G formed between the coupling groove 24G and the retention groove 26G. In particular, the shouldering surfaces 25G are integrally extended from the side surfaces 22G of the coupling groove 24G to the side retention surfaces 261G of the retention groove 26G respectively. In other words, the shouldering surfaces 25G are positioned between the front and back sides 11G, 12G of the lens 10G. It is worth to mention that the side surface 22G of the coupling groove 24G and side retention surfaces 261G of the retention groove 26G may parallelly extended with each other, and to form a substantially right angle between the shouldering surfaces 25G and the side surfaces 22G, and between the shouldering surfaces 25G and the side retention surfaces 261G.

Furthermore, each of the first side surfaces 22G has two outer edges 21G formed at the first opening edge 21G of the coupling groove 24G and two inner edges 27 formed at the opposed side of the outer edges 22G at a position between the contacting surface 23G and the two first side surfaces 22G respectively. A length of the outer edge 21G is slightly larger than a length of the inner edge 27G of the first side surface 22G, so that the shouldering surfaces 25G are inwardly and frontwardly inclined between the coupling groove 24G and the retention groove 26G therebetween to form the firmly connecting structure between the first and second connectors 20G, 30G, so as to further prevent the second connector 30G outwardly slid out the coupling slot 20G of the first connector 20G.

Referring to FIG. 32 to FIG. 34, the second connector 30G comprises a connecting member 31G and a clipping member 32G movably coupling with the connecting member 31G, wherein the connecting members 31G are provided at the rear sides of the temple units 2 and the bridge 3 respectively.

Each of the connecting members 31G comprises a retention inserter 311G and a coupling shaft 312G, wherein the retention inserter 311G has a shape and size corresponding to the shape and size of the respective coupling groove 24G of the coupling slot 20G. The retention inserter 311G is slidably inserted into the respective coupling groove 24G inwardly from the peripheral edge 13G of the lens 10G. The coupling shaft 312G is pivotally coupling with the clipping member 32G to lock up the retention inserter 311G at the coupling groove 24G.

Each of the retention inserters 311G has a plurality of retention surfaces 3111G, wherein the retention surfaces 3111G is shaped and sized corresponding to the shape of the coupling groove 24G for fittedly connecting with the side surfaces 22G and the contacting surface 23G, which is embodied as substantially flat surface. Alternatively the contacting surface 23G may be slightly curved depended on the manufacturing process thereof. When the retention inserter 311G is slidably inserted into the corresponding coupling groove 24G inwardly from the peripheral edge 13G of the lens 10G, the retention surfaces 3111G of the retention inserter 311G is biased against the contacting surface 23G to securely retain the second connector 30G at the predetermined location of the respective lens 10G.

The clipping member 32G is pivotally engaged with connecting member 31G via the coupling shaft 312G, wherein the clipping member 32G comprises a pressuring clipper 321G and a trigger 322G. The pressuring clipper 321G is pivotally coupled with the coupling shaft 312G of the connecting member 31G while the trigger 322G is extended from the pressuring clipper 321G. When the connecting member 31G of the second connector 30G is slidably inserted into the coupling groove 24G at the peripheral edge 13G of the lens 10G, the pressuring clipper 321G is being slid into the retention groove 26G at the same time for being received and retained within the retention groove 26G.

Therefore, the trigger 322G is adapted for being actuated to pivotally move the pressuring clipper 321G to bias against the shouldering surfaces 25G of the coupling slot 20G such that temple units 2 and the bridge 3 can be quickly and firmly engaged with the lenses 10G by the clipping force.

More specifically, the pressuring clipper 321G preferably has a size and shape substantially and geometrically matching the size and shape of the retention groove 26G for being received therein while the retention inserter 311G of the connecting member 31G is being slidably inserted into the coupling groove 24G. The pressuring clipper 321G further has a biasing surface 3211G, so that the trigger 322G is actuated, the biasing surface 3211G of the pressuring clipper 321G is biased against the shouldering surfaces 25G for securely coupling the temples 2 and bridge 3 with the respective lenses 10G. In other words, when the second connector 30G is coupled with the respective coupling slot 20G, the rear side of the temple unit 2 or the bridge 3 is biased against the front side 11G of the lens 10G while the biasing surface 3211G of the pressuring clipper 321G is biased against the shouldering surfaces 25G to securely and detachably couple the temple unit 2 or the bridge 3 with the lens 10G.

Therefore, each of the shouldering surfaces 25G is inwardly and frontwardly extending from the peripheral edge 13G of the lens 10G between the front and back sides 11G, 12G of the lens 10G at a position that the shouldering surface 25G is extended from the peripheral edge 13G of the lens 10G toward the contacting surface 23G of the coupling slot 20G. In other words, the shouldering surface 25G is inclinedly extending from the rear end of the first opening edge 21G and front end of the second opening edge 264G toward the contacting surface 23G. Accordingly, the biasing surface 3211G of the pressuring clipper 321G is biasing against the shouldering surface 25G for further preventing the pressuring clipper 321G outwardly slid out of the coupling slot 20G, so as to securely couple the lenses with the temples 2 and bridge 3 of the spectacles.

It is worth mentioning that the biasing surface 3211G of the pressuring clipper 321G is biased against the shouldering surfaces 25G when the trigger 322G is actuated to lock up the second connector 30G with the first connector 20G, wherein the biasing surface 3211G and the shouldering surfaces 25G may be flat surfaces for enhancing a surface engagement between the first and second connectors 20G, 30G.

Figure 34A:
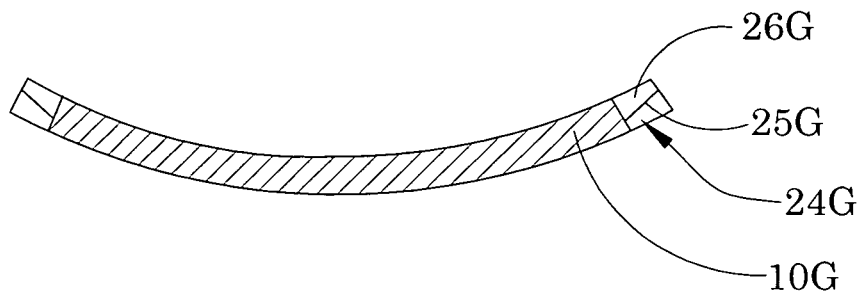
FIGS. 34A to 34C are schematic views illustrating the coupling slot incorporating with different types of lenses of the spectacles according to the above mentioned embodiment of the present invention.
Figure 34B:
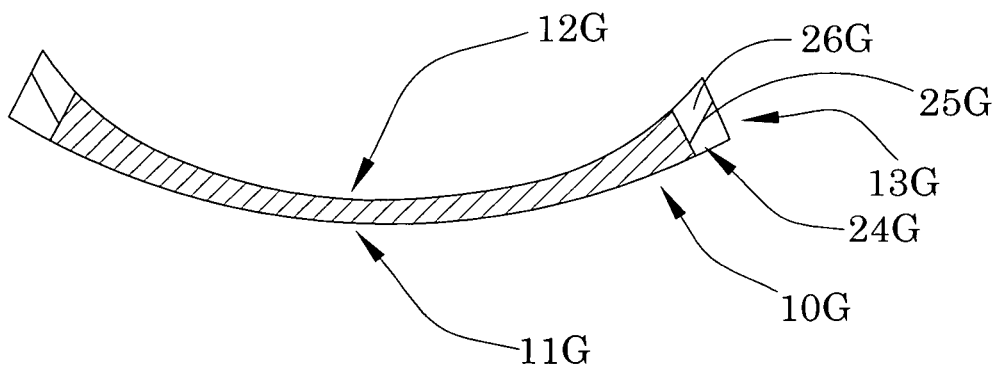
Figure 34C:
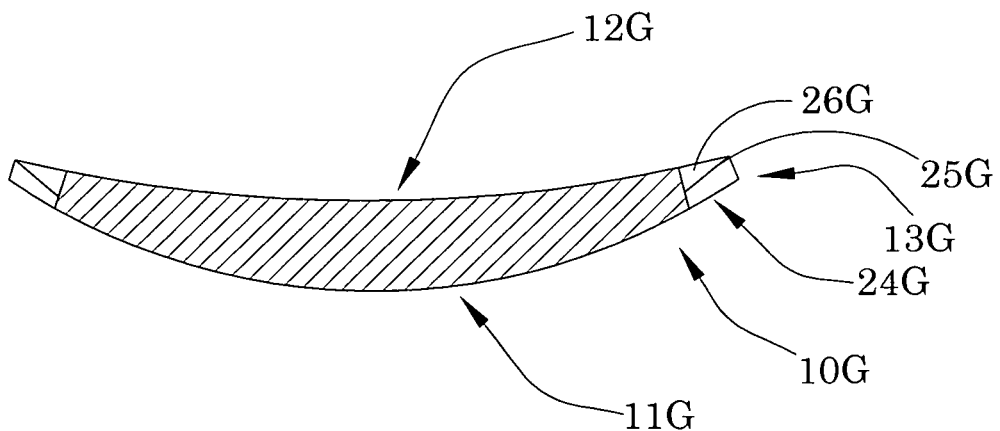

As will be readily appreciated by one skill in the art, the shouldering surface 25G is able to incorporate with myopia lenses 10G, as shown in FIG. 34B, or hyperopic lenses 10G, as shown in FIG. 34C. Especially for hyperopic lenses 10G, shouldering surface 25G has an inclined tendency opposed to the inclined tendency of the hyperopic lenses 10G, which is thicker in the central portion and thinner in the peripheral portion thereof, so that the shouldering surface 25G is able to significantly enhance the security of the engagement between the frame and the lenses 10G, as shown in FIGS. 34A, 34B, and 34C.

Accordingly, the coupling groove 24G has the similar structure of the coupling slot 20N in the above eighth preferred embodiment of the present invention, wherein the two first side surfaces 22G has the similar functionality and structure as above mentioned slot sidewalls 22N of the coupling slot 20N. Therefore, the first opening edges 21G (outer edges 21G of the first side surfaces 22G) are similar to the above outer edges 21N of the slot sidewall 22N, and the inner edges 27G of the first side surface 22G have the substantially functionality and structure of the above mentioned inner edges 27N of the slot sidewall 22N.

It will be readily appreciated that the coupling groove 24G having substantially functionality and structure of the coupling slot 20N in the above eighth preferred embodiment is able to be independently provided at the peripheral edge 13G of the lens 10G without the retention groove 26G. However, the retention groove 26G enables to form the frontwardly and inwardly inclined shouldering surface 25G at both myopia and hyperopic lenses 10G to form the firmly connecting structure between the first and second connectors 20G, 30G, so that the second connector 30G is able to securely couple at the coupling slot 20G to stably couple the frame with the respective lenses 10G. Furthermore, the retention groove 26G formed at the back side 12G of the lens 10G is able to minimize the visibility of the second connector 30G protruded at the back side 12G from the front view of the spectacles, so as to substantially hide the second connector 30G in the hidden manner. It should be noted that the clipping member 32G may still be rearwardly protruded out of the retention groove 26G.

It is important that the retention groove 26G located at the back side 12G of the lens 10G can also minimize the visibility of the clipping member 32G from the front view of the spectacles, so as to enhance the aesthetic feeling when the wearer is wearing the spectacles on his/her face. Therefore, the clipping member 32G is substantially located in the retention groove 26G in a hidden manner. Preferably, the thickness of the clipping member 32G is smaller than the thickness of the retention groove 26G such that when the clipping member 32G is received within the retention groove 26G, the clipping member 32G will not protruded out from the back side 12G of the lens 10G. In other words, when the respective second connector 30G is coupled with the coupling groove 20G, the second connector 30G is received within the coupling groove 34G and the retention groove 26G to embed the second connector 30G between the front and back sides 11G, 12G of the lens 10G. It is worth mentioning that when a thinner lens 10G is used, the clipping member 32G may slightly protrude from the back side 12G of the lens 10G.

Therefore, the retention groove 26G integrally formed at the rear of the coupling groove 24G and inwardly indented from the second opening edge 264G is able to support and hold the clipping member 32G within the retention groove 26G. The shouldering surfaces 25G of the retention groove 26G are able to further prevent the second connector 30G accidentally and outwardly sliding out of the coupling slot 20G of the first connector 20G.

Since the coupling slot 20G in the present invention is continuous channel defined by the opening edges 21G, 264G which are inwardly extended, such that it is unnecessary to drill any hole on the lenses 10G in the present invention. Technicians can easily cut at the peripheral edge 13G inwardly to form the coupling groove 24G and the retention groove 26G to form the coupling slot 20G.

It is appreciated that the coupling groove 24G can be rearwardly and indently formed at the back side 12G of each of the lenses 10G at the peripheral edge 13G thereof while the retention groove 26G can be frontwardly and indently formed at front side 11G of the lens 10G at the peripheral edge 13G thereof to communicatively align with the coupling groove 24G. In other words, the coupling groove 24G and the retention groove 26G are interchanged their positions. Therefore, the connecting members 31G can be correspondingly provided at the front sides of the temple units 2 and the bridge 3 respectively to detachably couple with the coupling slots 20G.

Figure 35:
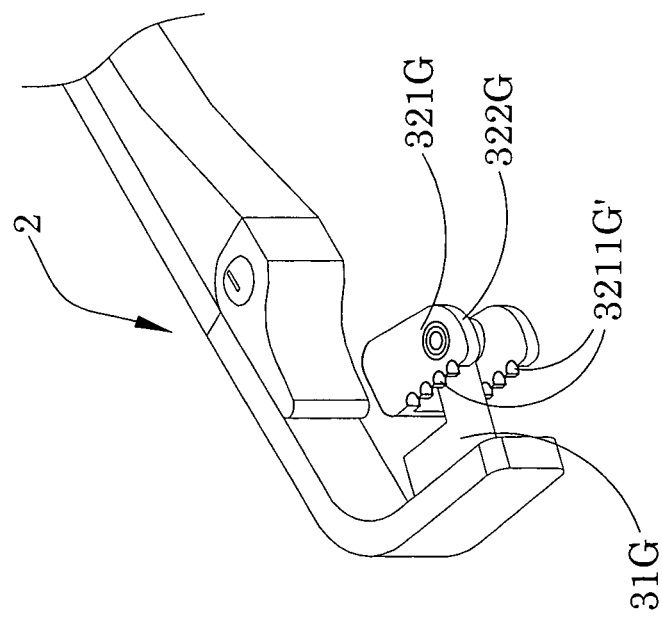
FIG. 35 is a perspective view of an alternative second connector of the spectacles according to the above preferred embodiment of the present invention.
Figure 36:
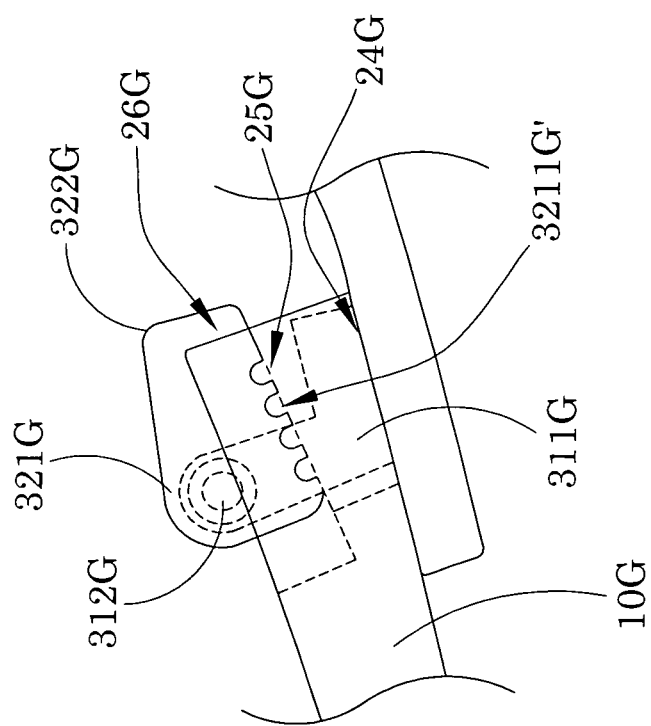
FIG. 36 is a side sectional view of the alternative second connector of the spectacles according to the above preferred embodiment of the present invention.

Referring to FIG. 35 and FIG. 36 of the drawings, an alternative of the second connector 30G of the ninth preferred embodiment of the present invention is illustrated, wherein the second connector 30G also has the connecting member 31G and the clipping member 32G. The connecting member 31G also comprises the retention inserter 311G and the coupling shaft 312G as mentioned above. The clipping member 32G has the pressuring clipper 321G and the trigger 322G as described above, wherein the pressuring clipper 321G has the alternative biasing surface 3211G', which is for biasing against the shouldering surfaces 25G.

In this preferred embodiment, the biasing surface 3211G' has a serrated shaped surface, so that the serrated biasing surface 3211G' is able to reduce the biasing force between the biasing surface 3211G' and the shouldering surfaces 25G of the coupling slot 20G, so as to prevent breaking the lenses 10G. The non-flat surface of the biasing surface 3211G' is able to further enhance the friction between the biasing surface 3211G' and the shouldering surfaces 25G, so as to further prevent the second connector 30G accidentally slid out of the coupling slot 20G.

Figure 37:
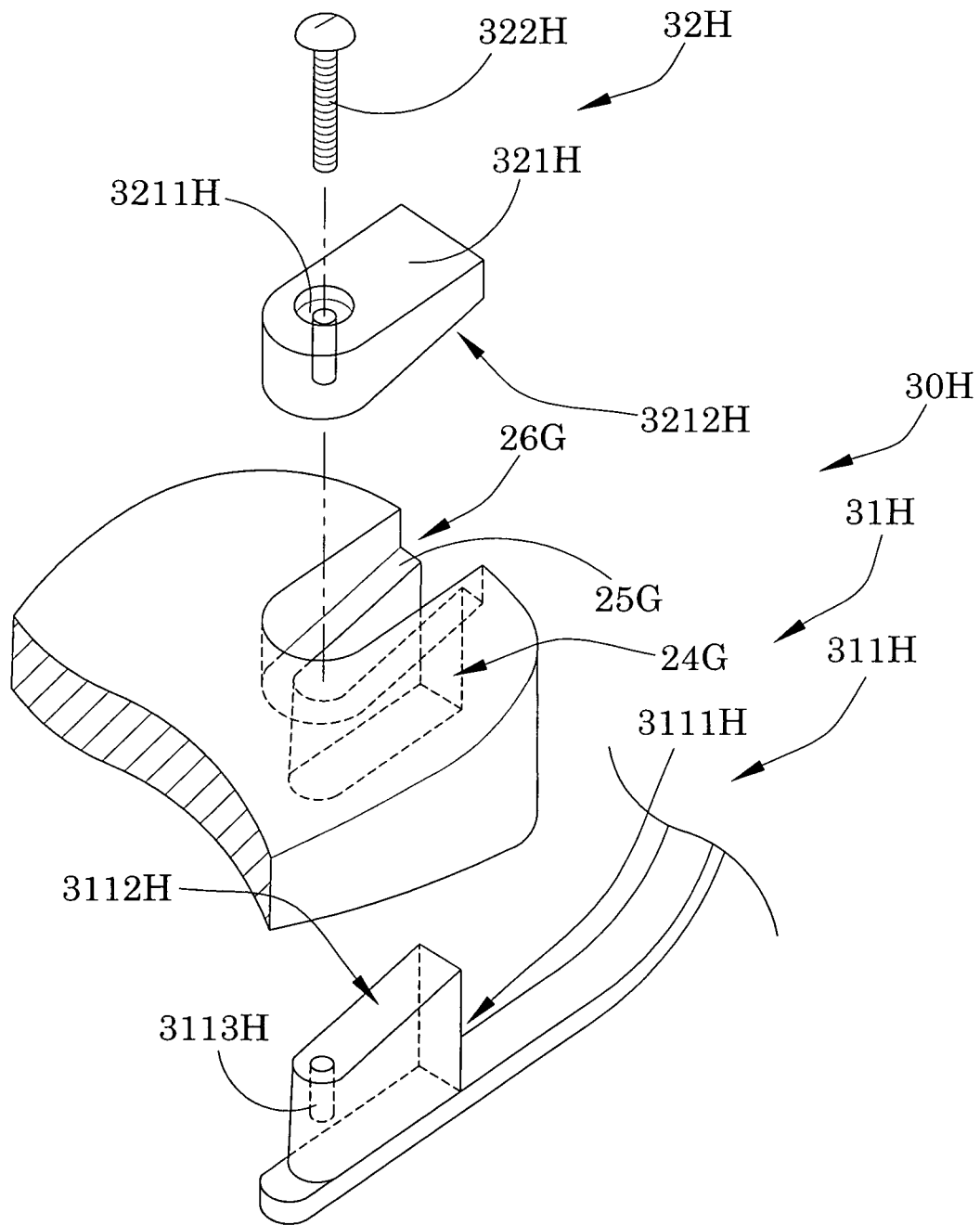
FIG. 37 is an exploded perspective view of a first and another alternative second connector of the spectacles according to the above preferred embodiment of the present invention.
Figure 38:
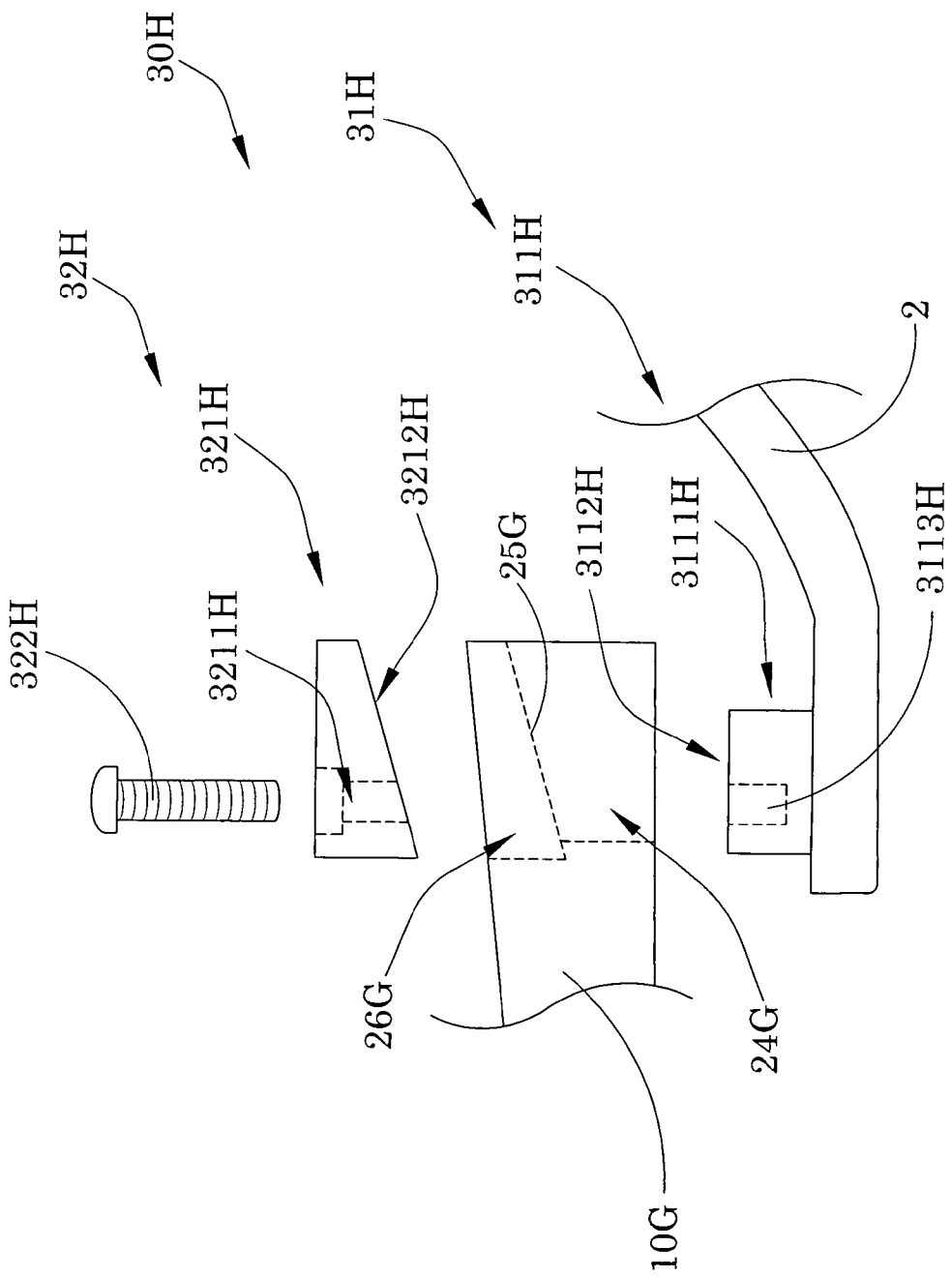
FIG. 38 is a side exploded sectional view of the alternative spectacles according to the above preferred embodiment of the present invention.
Figure 39:
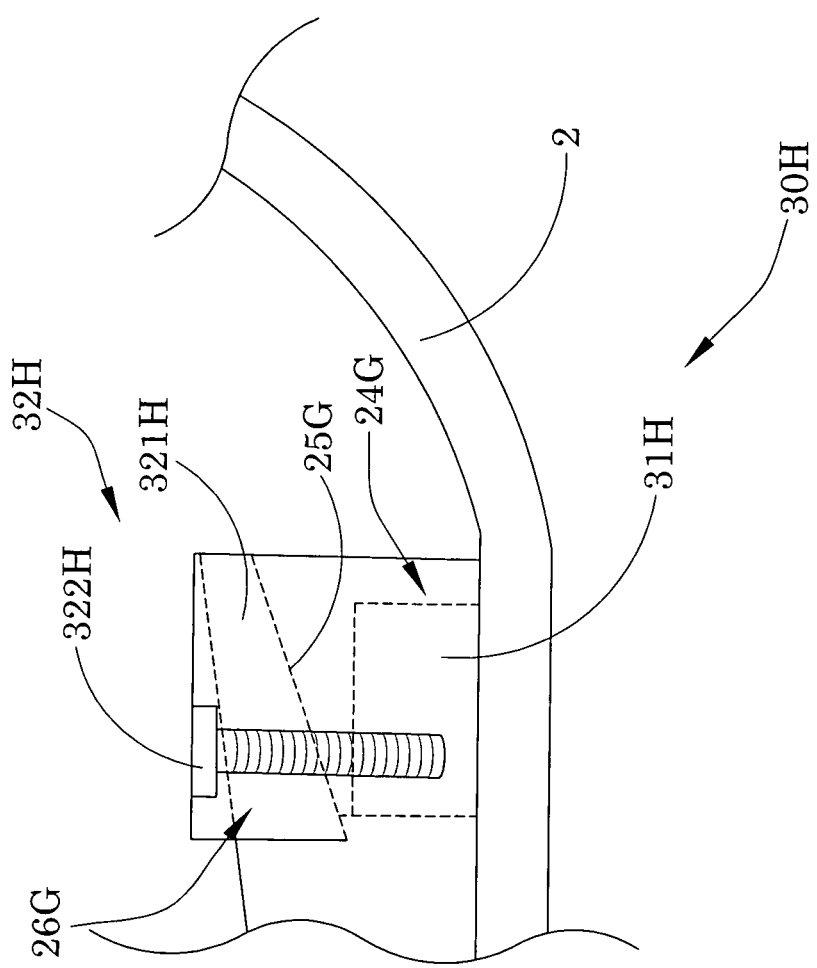
FIG. 39 is a side sectional view of the alternative second connector of the spectacles according to the above preferred embodiment of the present invention.

Referring to FIGS. 37 to 39 of the drawings, another alternative of the second connector 30H of the ninth preferred embodiment of the present invention is illustrated, wherein the second connector 30H comprises a retention element 31H and a fastening element 32H. The retention element 31H are provided at the rear sides of the temple units 2 and the bridge 3 respectively. Each of the retention elements 31H comprises a retention inserter 311H, wherein the shape of the retention inserter 311H is preferably designed correspondingly to the shape of the coupling groove 24G. More specifically, the retention inserter 311H has a retention surface 3111H and a biasing surface 3112H, wherein the retention surface 3111H is shaped and sized corresponding to the two side surfaces 22G and the contact surface 23G of the coupling groove 24G. Therefore, the retention inserter 311H is biased against the contact surface 23G to securely retain the second connector 30H at the predetermined location.

The fastening element 32H, corresponding to the retention element 31H, comprises a locking member 321H and a locking unit 322H. When the second connector 30H is placed at the coupling slot 20G of the lens 10G, the second connector 30H is fastened thereat via the locking member 321H and the locking unit 322H. In other words, after the retention inserter 311H is slidably inserted into the coupling groove 24G at the front side 11G of the respective lens 10G, the locking member 321H is slidably inserted into the retention groove 26G at the back side 12G of the respective lens 10G to bias against the shouldering surfaces 25G, such that the locking unit 322H is locked at both of the retention inserter 311H and the locking member 321H to form a secured locking structure between the first and second connectors 20G, 30H, as best shown in FIG. 39. Accordingly, the locking member 321H has a biasing surface 3212H biasing against the shouldering surfaces 25G when the locking member 321H is slidably coupled within the retention groove 26G. Preferably, the biasing surface 3212H of the locking member 321H is a slanted surface matching with the inclination of each of the shouldering surfaces 25G of the retention groove 26G.

Accordingly, the retention inserter 311H of the retention element 31H further has a first through channel 3113H having an opening at the biasing surface 3112H thereof. The locking member 321H of the fastening element 32H further has a second through channel 3211H substantially aligning with the opening of the first through channel 3113H for communicating therebetween, in such a manner that the locking unit 322H is able to extend through the second through channel 3211H to the first through channel 3113H to lock both the retention inserter 311H and the locking member 321H, so as to lock the second connector 30H at the coupling slot 20G for engaging the temple units with respective lenses 10G. Preferably, the locking unit 322H is a screw detachably coupling the locking element 321H with the retention inserter 311H. The second through channel 3211H has a size and shape matching with the size and shape of the head portion of the locking unit 322H such that the head portion of the locking unit 322H can be embedded within the locking element 321H.

It should be noted that the biasing surface 3212H adapted for contacting with the shouldering surface 25G is similar to the above mentioned biasing surface 3211N of the retention member 32N of the second connector 30N. Therefore, the second connector 30H may be able to couple with the coupling slot 20N via the biasing surface 3212H biasing against the shouldering surface 25N of the coupling slot 20N in the above eighth embodiment.

Figure 40:
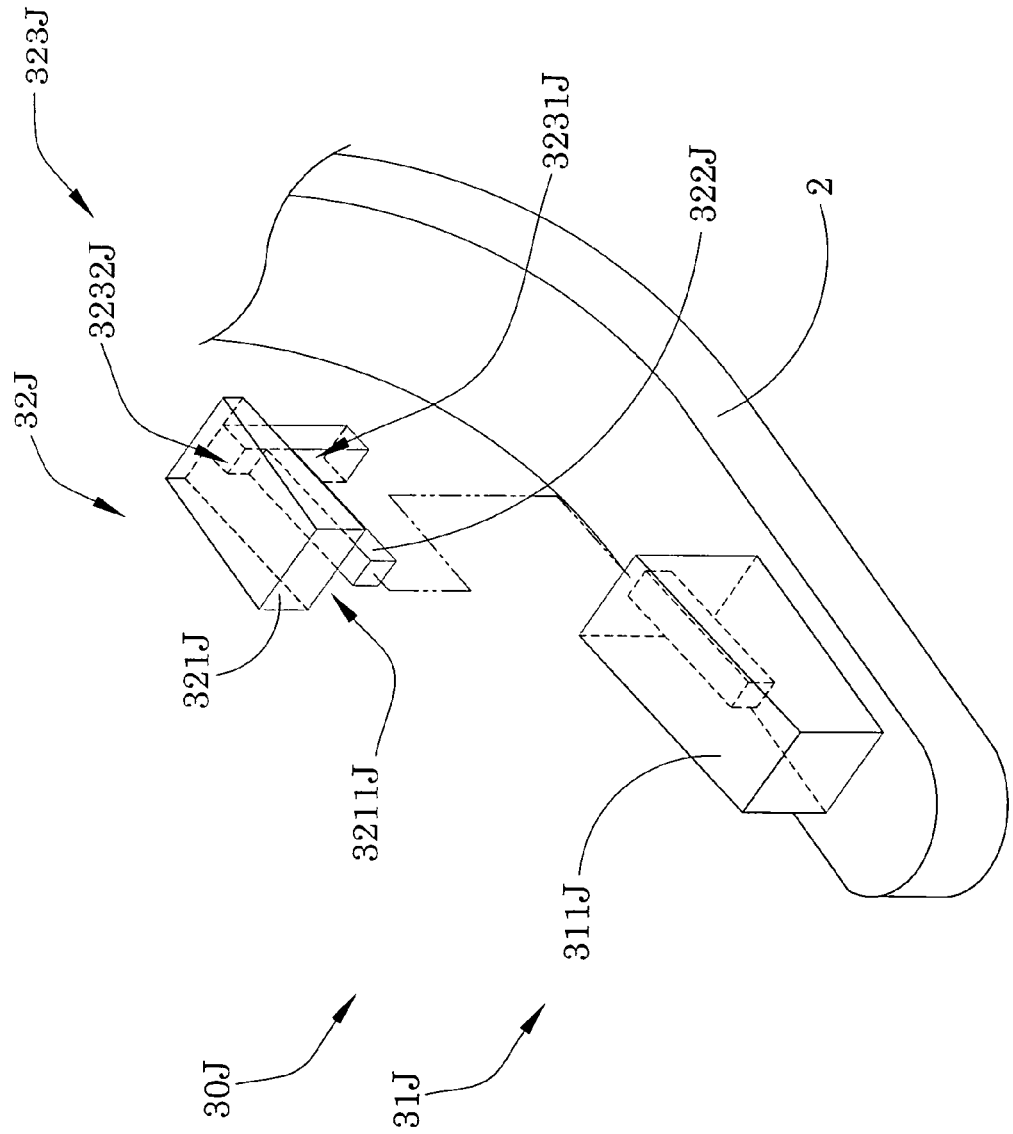
FIG. 40 is a 3-dimentional view of an alternative second connector of the spectacles according to another preferred embodiment of the present invention.
Figure 41:
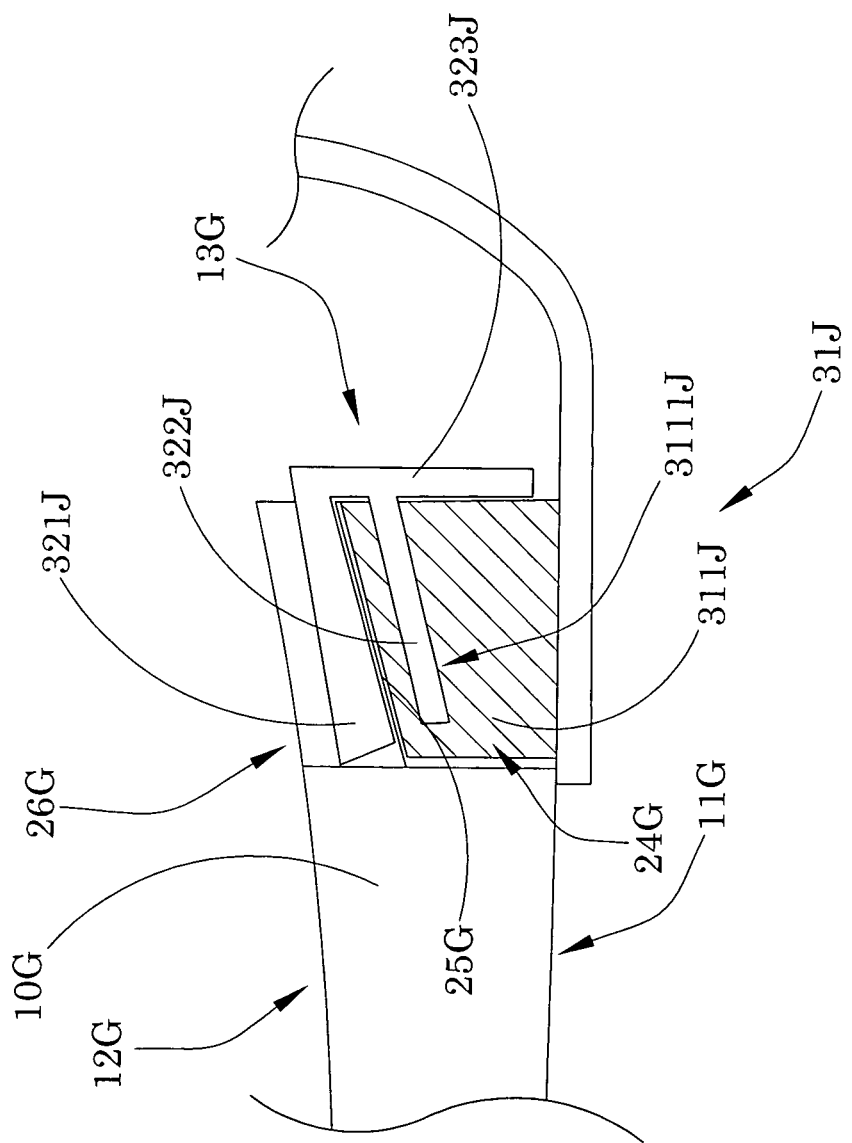
FIG. 41 is a side sectional view of the alternative spectacles according to the above preferred embodiment of the present invention.

Referring to FIGS. 40 to 41 of the drawings, an alternative second connector 30J of the spectacles of the above preferred embodiment is illustrated, wherein the second connectors 30J is adapted to incorporate with the coupling slot 20G of the first connector 20G as best shown in FIG. 41.

Each of the second connectors 30J comprises a connecting member 31J and a retention member 32J, wherein the connecting members 31J are provided at the rear sides of the predetermined locations of the temple units 2 and the bridge 3 respectively. As shown in FIG. 40, each of the connecting members 31J comprises a coupling inserter 311J preferably having a size and shape geographically matching the coupling groove 24G of the coupling slot 20G of the first connector 20G for coupling the temple units 2 with the respective first connector 20G at the respective lens 10G. Each of the coupling inserters 311J has a retention cavity 3111J sidewardly extending within the coupling inserter 311J to form an opening between two first opening edges 21G of the coupling groove 24G when the coupling inserter 311J is fittedly being received within the coupling groove 24G.

The retention member 32J further has a first retention portion 321J and a second retention portion 322J, wherein the first retention portion 321J has a shape and size corresponding to the retention groove 26G adjacent to the rear side of the lenses 10G, while the second retention portion 322J is adapted for fittedly inserting into the retention cavity 3111J at the coupling inserter 311J within the coupling groove 24G. In other words, the first retention portion 321J is integrally formed with the second retention portion 322J via a retention element 323J to form a F-shaped cross sectional configuration, wherein the retention element 323J has an engaging surface 3231J and an end surface 3232J. The second retention portion 322J is sidewardly extending from the engaging side surface 3231J and the first retention portion 321J is sidewardly extending from the end surface 3232J of the retention element 323J, in such a manner that when the second retention portion 322J is inserting into the retention cavity 3111J, the engaging surface 3231J is substantially covering the first opening 211G of the coupling groove 24G while the first retention portion 321J is fittedly coupling with the retention groove 26G to lock up the connecting member 31J with the coupling slot 20G via the retention member 32J. In addition, the size of the first retention portion 321J of the retention member 32J matches with the size of the retention groove 26G such that after the first retention portion 321J of the retention member 32J slidably inserted into the retention groove 26G, the biasing surface 3211J of the first retention portion 321J of the retention member 32J will bias against the shouldering surfaces 25G. In addition, the biasing surface 3211J of the first retention portion 321J of the retention member 32J is a slanted surface matching with an inclination of each of the shouldering surfaces 25G of the retention groove 26G.

Figure 42:
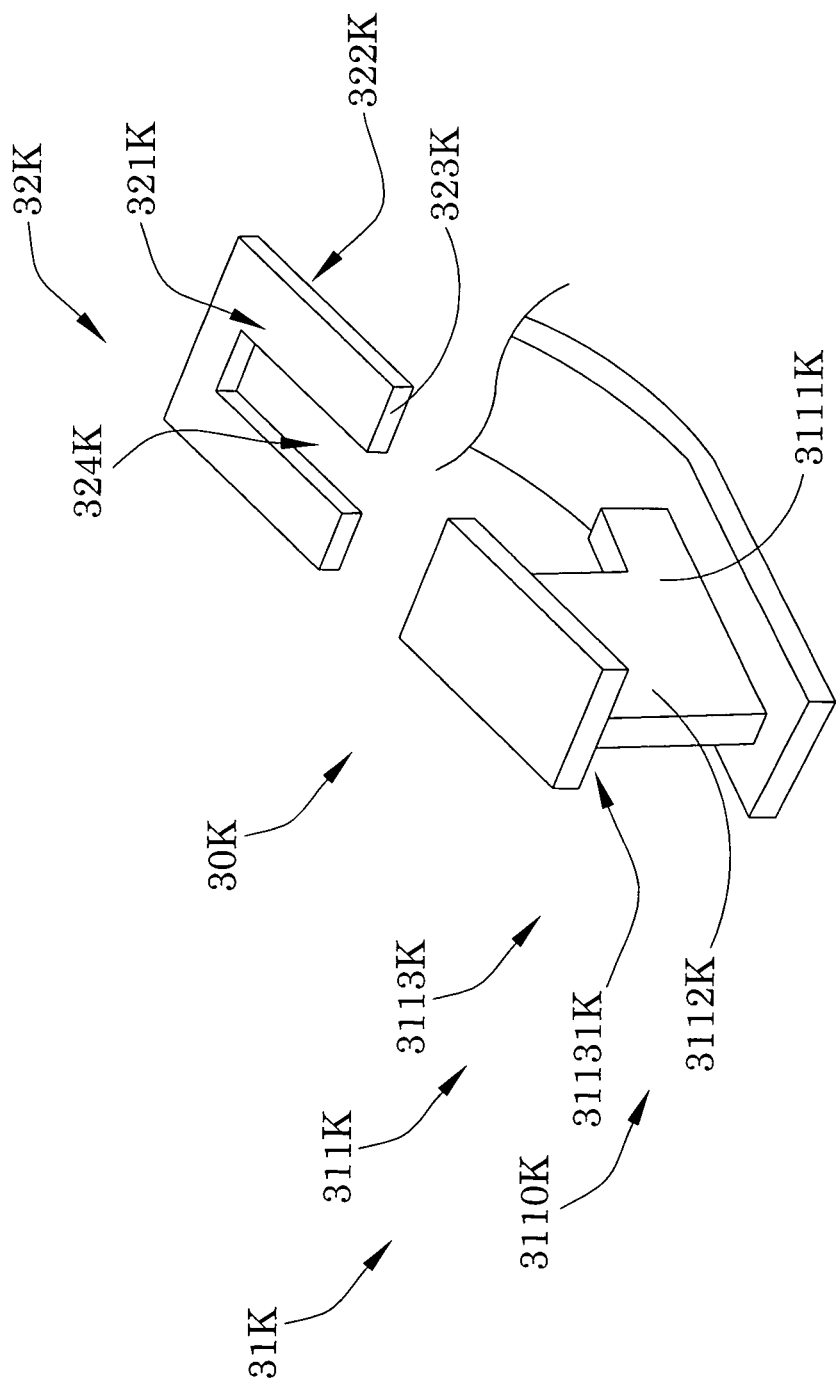
FIG. 42 is a 3-dimentional view of an alternative second connector of the spectacles according to another preferred embodiment of the present invention.
Figure 43:
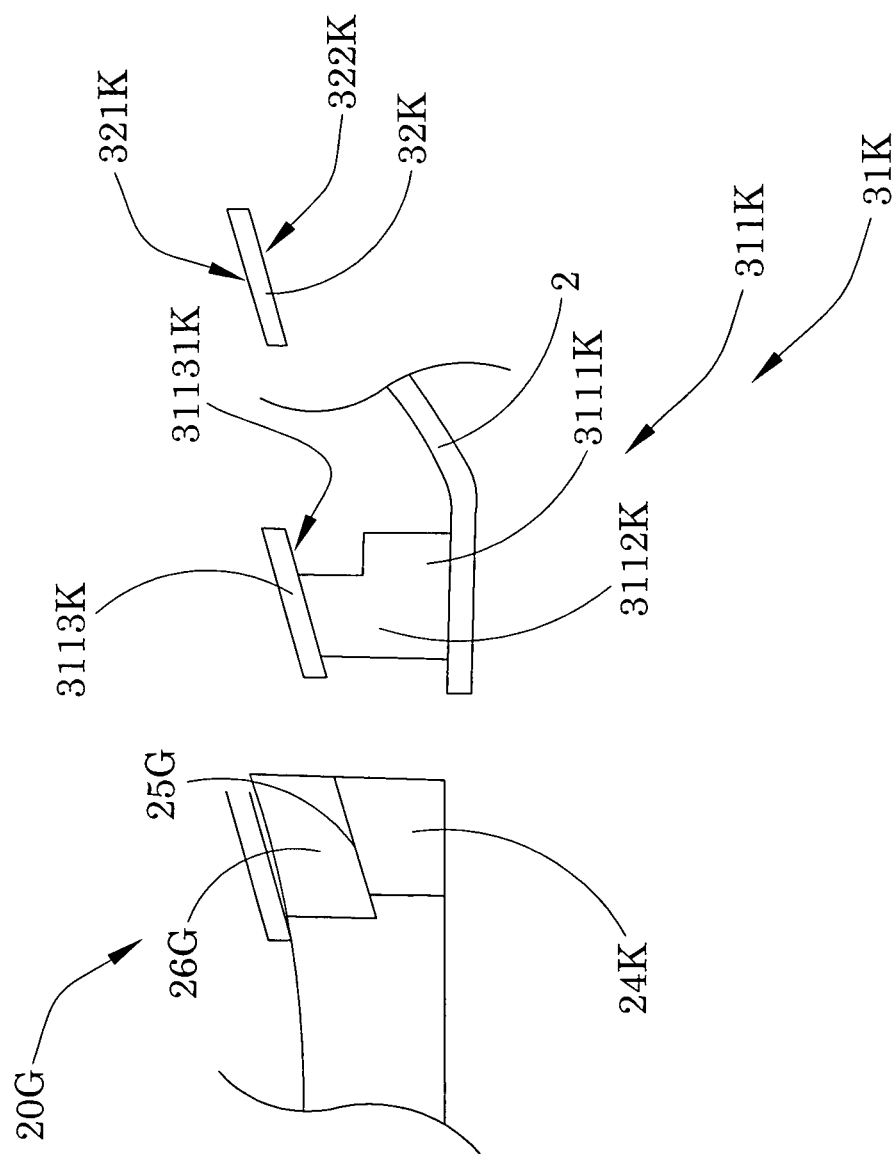
FIG. 43 is an exploded side sectional view of the alternative spectacles according to the above preferred embodiment of the present invention.
Figure 44:
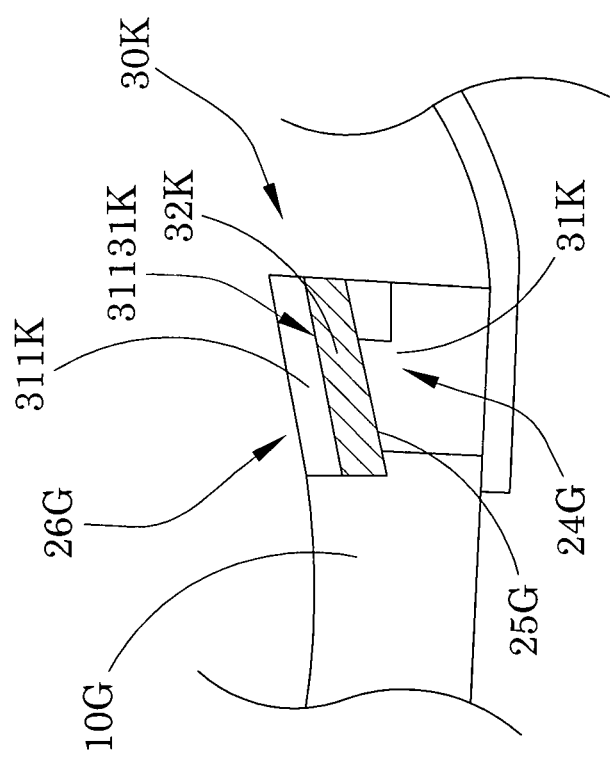
FIG. 44 is a side sectional view of the alternative spectacles according to the above preferred embodiment of the present invention.

Referring to FIG. 42 to FIG. 44 of the drawings, another alternative second connector 30K for coupling with the coupling slot 20G according to the above mentioned preferred embodiment of the present invention is illustrated. Each of the second connectors 30K comprises a connecting member 31K and a retention member 32K, wherein the connecting members 31K are provided at the predetermined locations of the temple units 2 and the bridge 3 respectively. Each of the connecting members 31K comprises a coupling inserter 311K for being received within the coupling slot 20G, wherein the coupling inserter 311K further has a first inserting portion 3111K, a second inserting portion 3112K integrally and rearwardly extending from the first inserting portion 3111K via one end, and a limiting element 3113K extended from the other end of the second inserting portion 3112K to form a front limiting face 31131K of the limiting element 3113K.

The first inserting portion 3111K has a shape and size geographically matching the coupling groove 24G of the coupling slot 20G for fittedly coupling the second connector 30K at the temple units 2 with the respective coupling slots 20G. In other words, the first inserting portion 3111K has a biasing surface 31110K for biasing against the two side surfaces 22G and the contact surface 23G at the coupling groove 24G of coupling slot 20G, so as to coupling the temple unit 2 and bridge unit 3 with the respective lenses 10G. The second inserting portion 3112K is integrally extending from the first inserting portion 3111K and arranged that when the first inserting portion 3111K is inserted into the coupling groove 24G, the second inserting portion 3112K is substantially being received in the retention groove 26G at the rear of the coupling groove 24G. In other words, when the first inserting portion 3111K is inserted into the coupling groove 24G, the limiting element 3113K is positioned above the shouldering surfaces 25G of the coupling slot 20G.

The retention member 32K has a proximately "U" shaped configuration having a first contacting side 322K, an opposed second contacting side 321K, and two biasing faces 323K spacedly form an inserting opening 324K therebetween for slidably receiving the second inserting portion 3112K of the coupling inserter 311K. Therefore, the retention member 32K is adapted for being inserted into the retention groove 26G through the inserting opening 324K at a position between the limiting element 3113J and the shouldering surfaces 25G to lock up the connecting member 31K at the coupling slot 20G. More specifically, when the retention member 32K is inserted into the retention slot 26G, the biasing faces 323K are slid into the coupling groove 20G to bias against the contact surface 23G thereof while the rear and front contacting sides 321K, 322K are biasing against the limiting face 31131K and the two shouldering surfaces 25G respectively. Therefore, the connecting member 31K is interlockingly locked up with the retention member 32K to connect the second connector 30K at the coupling slot 20G. The front contacting side 322K of the retention member 32K is a slanted surface matching with the inclination of each of the shouldering surfaces 25G of the retention groove 26G.

Figure 45:
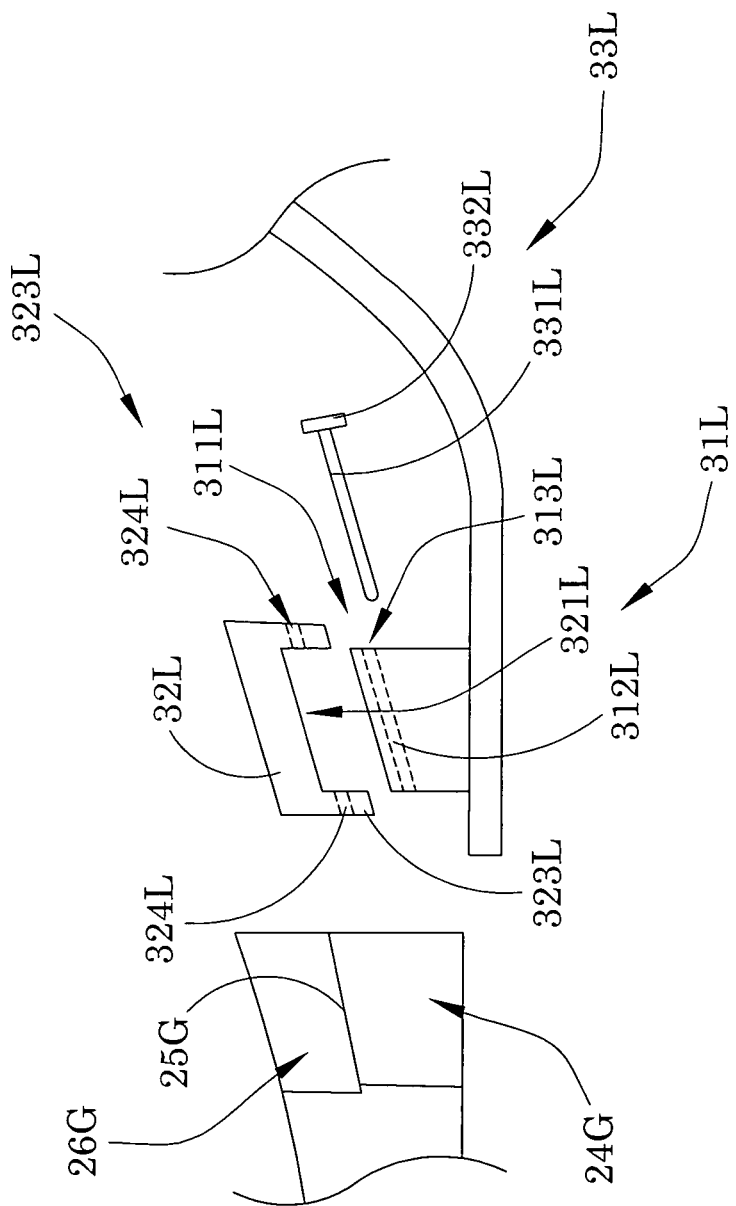
FIG. 45 is an exploded side sectional view of alternative spectacles according to another preferred embodiment of the present invention.
Figure 46:
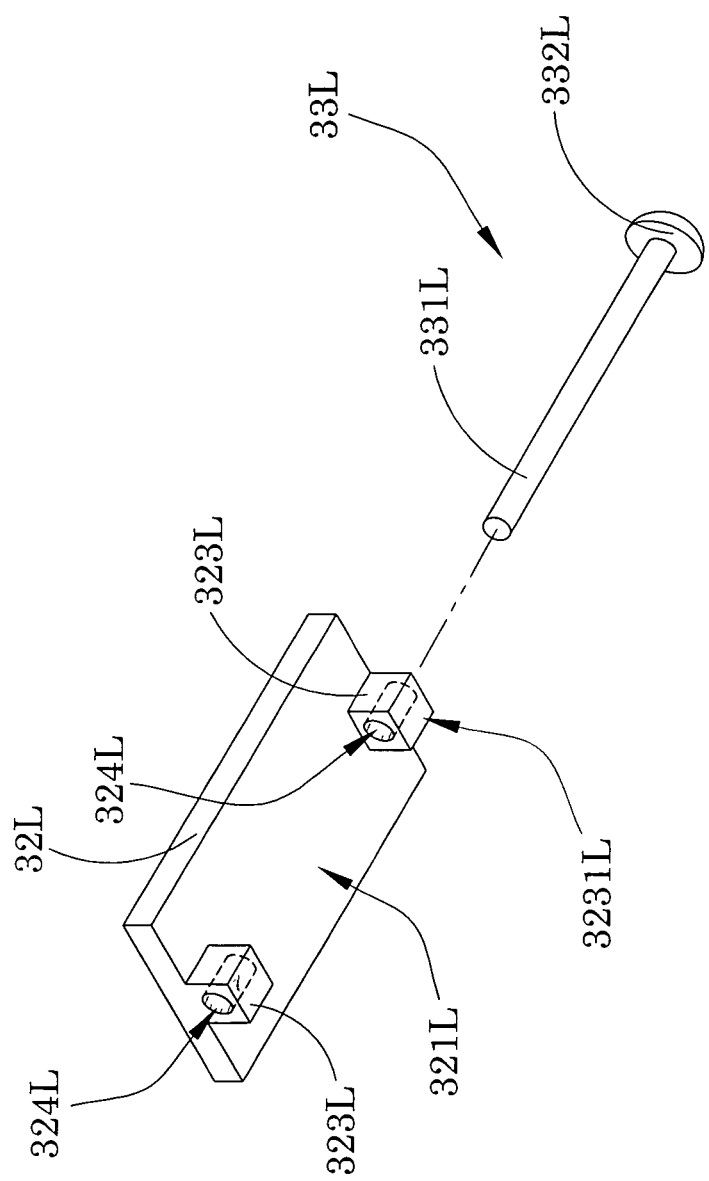
FIG. 46 is a 3-dimentional view of a retention member of an alternative second connector of the spectacles according to the above preferred embodiment of the present invention.

Referring to FIG. 45 and FIG. 46 of the drawings, still another alternative second connector 30L of the spectacles of the above preferred embodiment is illustrated, wherein the second connectors 30L is adapted to incorporate with the coupling slot 20G of the first connector 20G.

The second connectors 30L comprises a connecting member 31L and a retention member 32L, wherein the connecting members 31L are provided at the predetermined locations of the temple units 2 and the bridge 3 respectively. Each of the connecting members 31L is adapted for being received within the coupling slot 20G for fittedly engaging with the coupling groove 24G and rearwardly extending toward the retention groove 26G to form a protruding portion 311L thereat. An elongated through cavity 312L may further sidewardly formed at the protruding portion 311L to form two through openings 313L thereof at two sides of the connecting members 31L at the protruding portion 311L.

The retention member 32L preferably has a corresponding shape for covering and interlocking with the protruding portion 311L at the retention groove 26G of the coupling slot 20G. In other words, the retention member 32L has a biasing surface 321L, so that when the retention member 32L is covering the protruding portion 311L of the connecting member 31L, the biasing surface 321L is preferably biasing against the shouldering surfaces 25G of the retention groove 26G. The biasing surface 321L of the retention member 32L is a slanted surface matching with an inclination of each of the shouldering surfaces 25G of the retention groove 26G.

The retention member 32L may further comprises two retention element 323L are frontwardly protruded from the biasing surface 321L to form a substantial "T" side sectional shape, as best shown in FIG. 46. Two through holes 324L are further formed at the two retention elements 323L respectively and arranged that when the retention member 32L is coupling with the protruding portion 311L of the connecting member 31L, the two through holes 324L are aligning with the two through openings 313L of the through cavity 312L at two sides of connecting member 31L. Preferably, each of the retention elements 323L further has a biasing surface 3231L for biasing against the shouldering surface 25G of the coupling slot 20G.

According to the preferred embodiment, the second connector 30L further comprises at least a retaining inserter 33L having a shape and size approximately matching the shape and size of the through cavity 312L and the through holes 324L. Therefore, the retaining inserter 33L preferably has an elongated body portion 331L for slidably inserted into the through holes 324L and the through cavity 312L and an enlarged head portion 332L extended from one end of the elongated body portion 331L. Accordingly, when the retaining inserter 33L is slidably passing the respective through hole 324L and the through opening 313L at one side to extend through the through cavity 312L and the other through hole 324L, the enlarged head portion 332L is located at the peripheral side 13G of the lens 10G adjacent to the second opening 265G of the retention groove 26G, so as to lock up the second connector 30L with the coupling slot 20G of the first connector 20G. Therefore, the temple units 2 and the bridge 3 can be securely coupled with the lenses 10G to form the rimless structure. It should be noted that the coupling groove 24G and/or the retention groove 26G are preferably formed a shape corresponding to the connecting member 31L and the retention member 32L respectively, so as to enhance the security engagement between the first and second connectors 20G, 30L.

It is worth to mention that the retaining inserter 33L can be an elastic material, such as rubber or plastic, for enhancing the frictions between the through cavity 312L and the retaining inserter 33L to form the secure lock up structure therebetween. The retaining inserter 33L can also be a rigid material, such as screw for rotatably fastening the retention member 32L with the connecting member.

It should be noted that the biasing surface 3231L adapted for contacting with the shouldering surface 25G is similar to the function of the above mentioned biasing surface 3211N of the retention member 32N of the second connector 30N. Therefore, the second connector 30L may be able to couple with the coupling slot 20N via the biasing surface 3231L biasing against the shouldering surface 25N of the coupling slot 20N in the above eighth embodiment. Therefore, a shouldering surface 25G' may be further defined at the back side 12G of the lens 10G, so that the second connector 30G may be able to bias against both the shouldering surfaces 25G and 25G'.

Figure 47:
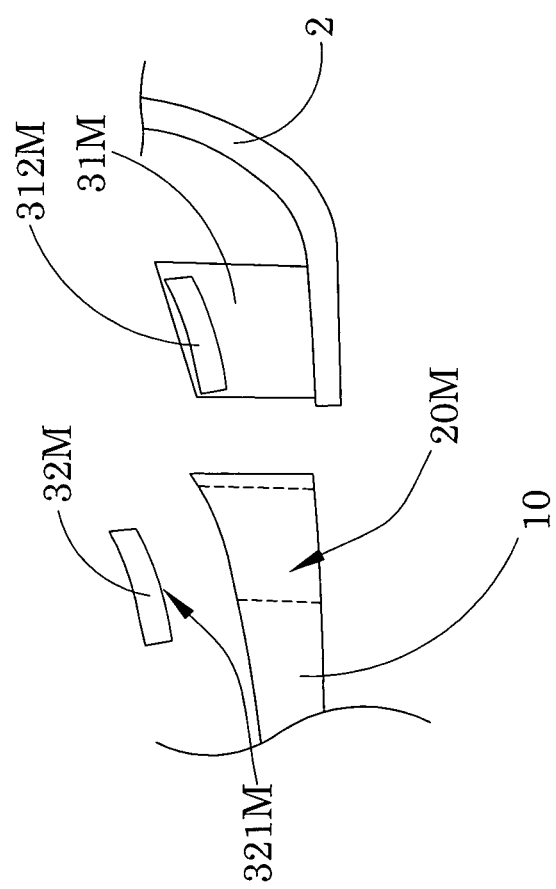
FIG. 47 is an exploded side sectional view of alternative spectacles according to another preferred embodiment of the present invention.
Figure 48:
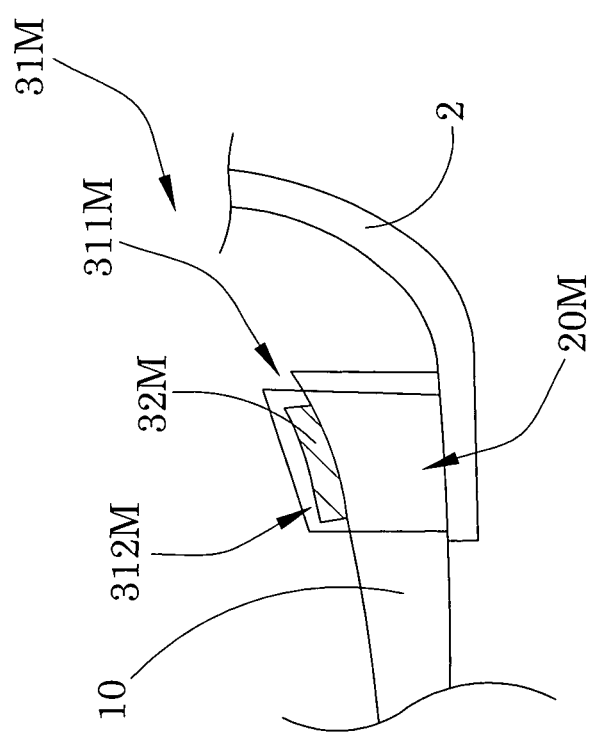
FIG. 48 is a side sectional view of the alternative spectacles according to the above preferred embodiment of the present invention.
Figure 49:
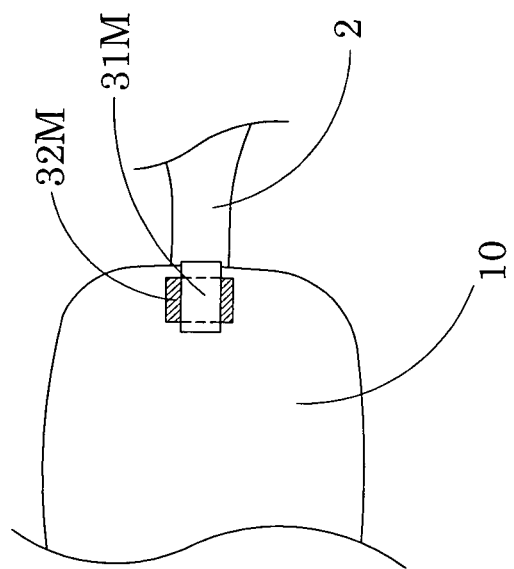
FIG. 49 is a partially rear view of the alternative spectacles according to the above preferred embodiment of the present invention, illustrating the second connector attached to the respective first connector.

Referring to FIG. 47 to FIG. 49 of the drawing, a spectacles according to a tenth preferred embodiment of the present invention is illustrated, wherein the spectacles has the similar structure as mentioned in the above preferred embodiments. The spectacles comprises the temple unit 2, the bridge 3, lens 10, a plurality of first connectors 20M at the peripheral edge 13 of the lens 10, and second connectors 30M for coupling with the respective first connectors 20M.

In the preferred embodiment, the first connector 20M is a through coupling slot 20M provided at the predetermined location of the lens 10. Each of the second connectors 30M comprises a connecting member 31M and a retention member 32M, wherein the connecting members 31M are provided at the predetermined locations of the temple unit 2 and the bridges respectively. Each of the connecting members 31M preferably has a shape and size corresponding to the shape and size of the through coupling slot 20M.

Each of the connecting members 31M is slidably received within the through coupling slot 20M for fittedly engaging therewith and rearwardly protruding out of the through coupling slot 20M to form a protruding portion 311M at the back side 12 of the lens 10, so as to form an inserting plug. A through cavity 312M may further form at the protruding portion 311M thereat.

The retention member 32M is adapted for slidably inserting into the through cavity 312M at the protruding portion 311M of the connecting member 31M at the back side 12 of the lens 10 to lock up the second connector 30M with the first connector 20M. The retention member 32M further has a biasing surface 321M biasing against the back side 12 of the lens 10 to retain the retention member 32M in position. The biasing surface 321M of the retention member 32M is made of non-scratching material for preventing the back side 12 of the lens 10 being scratched.

Accordingly, after the connecting member 31M is slidably inserted through the respective through coupling slot 20M at the lens 10, the retention member 32M is then slidably inserted into the through cavity 312M of the respective connecting member 31M at the rear side of the lens 10 so as to apply an outward pushing force against the connecting member 31M. Therefore, the temple units 2 and the bridge 3 can be securely coupled with the lenses 10 to form the structure of spectacles.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A pair of spectacles, comprising:
two lenses, each of said lenses having a front side, a back side, and a peripheral edge;
a frame which comprises two temple units and a bridge; and
a connection mechanism, which comprises:
a plurality of coupling slots indentely formed at said peripheral edge of each of said lenses, wherein each of said coupling slots has a coupling groove indent from said front side of said lens and a retention groove indent from said back side of said lens to align with said coupling groove; and
a plurality of second connectors provided at a predetermined location of said frame and arranged in such a manner that when said second connectors are detachably coupled with said coupling slots respectively, said second connector is received within said coupling groove and said retention groove to embed said second connector between said front and back sides of said lens, wherein each of said second connectors comprises a connecting member provided at a rear side of each of said temple units and said bridge, and a clipping member movably coupled with said connecting member, wherein when said second connector is coupled with said coupling slot, said connecting member is retained within said coupling groove while said clipping member is retained within said retention groove to securely and detachably couple said temple units and said bridge with said lenses.

2. The spectacles, as recited in claim 1, wherein a size of said coupling groove is smaller than a size of said retention groove.

3. The spectacles, as recited in claim 2, wherein a first opening of said coupling groove and a second opening of said retention groove are formed at said peripheral edge of said lens and are aligned with each other.

4. The spectacles, as recited in claim 3, wherein each of said coupling slot further has at least one shouldering surfaces formed between said coupling groove and said retention groove, wherein each of said shouldering surfaces is formed between said front and back sides of said lens, wherein each of said shouldering surfaces is an inclined surface inwardly and frontwardly extending from said peripheral edge of said lens, wherein when said second connector is coupled with said respective coupling groove, said rear side of each of said temple units and said bridge is biased against said front side of said lens while said second connector is biased against said shouldering surfaces to securely couple said temple units and said bridge with said lens.

5. The spectacles, as recited in claim 4, wherein when said second connector is coupled with said respective coupling slot, said connecting member is retained within said coupling groove while said clipping member is retained within said retention groove and is biased against said shouldering surfaces to securely couple said temple units and said bridge with said lens.

6. The spectacles, as recited in claim 4, wherein each of said connecting members comprises a retention inserter slidably inserted into said respective coupling groove inwardly from said peripheral edge of said lens and a coupling shaft pivotally coupling with said clipping member to lock up said retention inserter at said coupling groove, wherein said clipping member comprises a pressuring clipper pivotally coupled with said coupling shaft of said connecting member, and a trigger extended from said pressuring clipper, wherein said trigger is actuated to pivotally move said pressuring clipper to bias against said shouldering surfaces to lock up said second connector with said coupling slot.

7. The spectacles, as recited in claim 6, wherein said pressuring clipper has a biasing surface biasing against said shouldering surfaces when said trigger is actuated to lock up said second connector with said coupling slot, wherein said biasing surface and said shouldering surfaces are flat surfaces for enhancing a surface engagement between said coupling slots and said second connectors.

8. The spectacles, as recited in claim 7, wherein said biasing surface of said pressuring clipper has a serrated shaped surface for reducing a biasing force between said biasing surface and said shouldering surfaces of said coupling slot when said trigger is actuated to lock up said second connector with said coupling slot.

9. The spectacles, as recited in claim 1, wherein a first opening of said coupling groove and a second opening of said retention groove are formed at said peripheral edge of said lens and are aligned with each other.

10. The spectacles, as recited in claim 1, wherein each of said coupling slot further has at least one shouldering surfaces formed between said coupling groove and said retention groove, wherein each of said shouldering surfaces is formed between said front and back sides of said lens, wherein each of said shouldering surfaces is an inclined surface inwardly and frontwardly extending from said peripheral edge of said lens, wherein when said second connector is coupled with said respective coupling groove, said rear side of each of said temple units and said bridge is biased against said front side of said lens while said second connector is biased against said shouldering surfaces to securely couple said temple units and said bridge with said lens.

* * * * *